US012651933B2

(12) United States Patent
Anwer et al.

(10) Patent No.: US 12,651,933 B2
(45) Date of Patent: Jun. 9, 2026

(54) TRANSMITTER ASSEMBLY AND METHODS FOR MAKING AND USING THE SAME

(71) Applicant: HEVO INC., Brooklyn, NY (US)

(72) Inventors: Umer Anwer, Niagara Falls (CA); Kerim Colak, Brooklyn, NY (US); Jeremy Mccool, Brooklyn, NY (US); Firat Uner, Istanbul (TR); Dhaval Palsana, Torrance, CA (US); Seunghoon Jeong, Torrance, CA (US)

(73) Assignee: HEVO, INC., Brooklyn, NY (US)

( * ) Notice: Subject to any disclaimer, the term of this patent is extended or adjusted under 35 U.S.C. 154(b) by 0 days.

(21) Appl. No.: 18/506,473

(22) Filed: Nov. 10, 2023

(65) Prior Publication Data

US 2024/0079913 A1 Mar. 7, 2024

Related U.S. Application Data

(63) Continuation of application No. 17/592,318, filed on Feb. 3, 2022, now Pat. No. 11,817,720.
(Continued)

(51) Int. Cl.
*H02J 50/70* (2016.01)
*B60L 53/122* (2019.01)
(Continued)

(52) U.S. Cl.
CPC ............ *H02J 50/70* (2016.02); *B60L 53/122* (2019.02); *B60L 53/38* (2019.02); *H02J 50/12* (2016.02); *H02J 50/90* (2016.02)

(58) Field of Classification Search
CPC . H02J 50/70; H02J 50/12; H02J 50/90; B60L 53/122; B60L 53/38; B60L 53/12; B60L 53/39
See application file for complete search history.

(56) References Cited

U.S. PATENT DOCUMENTS

2012/0112552 A1 5/2012 Baarman et al.
2014/0292097 A1 10/2014 Mach et al.
(Continued)

FOREIGN PATENT DOCUMENTS

WO 2013051947 A1 4/2013
WO 2019057777 A1 3/2019

OTHER PUBLICATIONS

International Search Report and Written Opinion issued on May 30, 2022, in counterpart International Patent Application No. PCT/US2022/015121 (13 pages).

*Primary Examiner* — Daniel Cavallari
*Assistant Examiner* — Terrence R Willoughby
(74) *Attorney, Agent, or Firm* — Bookoff McAndrews, PLLC

(57) ABSTRACT

Transmitter assemblies and methods for making and using the same. The transmitter assembly can be used for magnetic power transfer. The transmitter assembly can include a primary inductor configured to produce an electromagnetic field. The transmitter assembly can include a back shield unit including a primary back shield that has a first surface proximal to the primary inductor and a second surface opposite to the first surface. The primary back shield is at least partially made of a ferromagnetic material and has a property that is non-uniformly distributed from a center region of the primary back shield to an outer perimeter region of the primary back shield. The property includes a thickness, a magnetic property, or a combination thereof. When used in wireless charging, the transmitter assembly results in improved coupling factor, misalignment tolerance, efficiency, magnetic emissions and z-height coupling distance of a magnetic power transfer profile.

20 Claims, 32 Drawing Sheets

100

Related U.S. Application Data

(60) Provisional application No. 63/145,901, filed on Feb. 4, 2021.

(51) Int. Cl.
_B60L 53/38_ (2019.01)
_H02J 50/12_ (2016.01)
_H02J 50/90_ (2016.01)

(56) References Cited

U.S. PATENT DOCUMENTS

| | | | |
|---|---|---|---|
| 2014/0327391 A1 | 11/2014 | Niederhauser et al. | |
| 2016/0006288 A1 | 1/2016 | Wagman et al. | |
| 2016/0072308 A1* | 3/2016 | Nyberg | H02J 7/0042 |
| | | | 307/104 |
| 2017/0187220 A1 | 6/2017 | Rosenfeld et al. | |
| 2018/0137972 A1 | 5/2018 | Widmer et al. | |
| 2018/0174745 A1 | 6/2018 | Percebon et al. | |
| 2018/0178666 A1* | 6/2018 | Javaid | H02J 50/90 |
| 2019/0140481 A1 | 5/2019 | Keeling et al. | |
| 2019/0173317 A1 | 6/2019 | Zaheer et al. | |
| 2019/0305609 A1 | 10/2019 | Park et al. | |
| 2019/0355500 A1 | 11/2019 | Lee et al. | |
| 2022/0209586 A1 | 6/2022 | Kyaw et al. | |
| 2022/0375683 A1 | 11/2022 | Hameed et al. | |

* cited by examiner

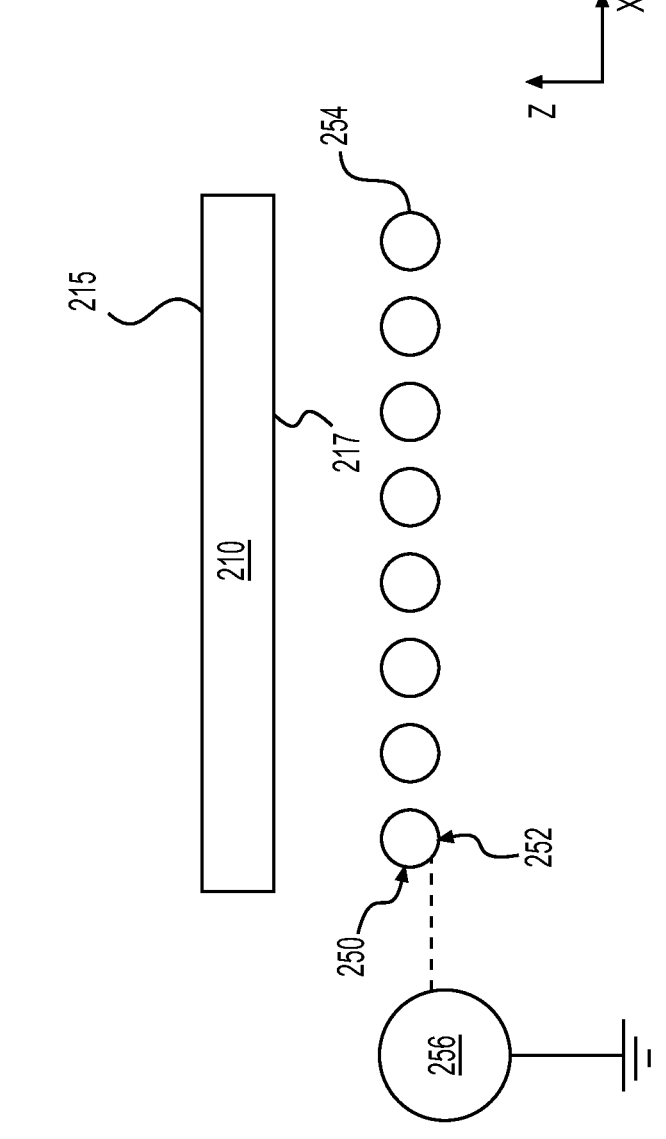
*FIG. 16*

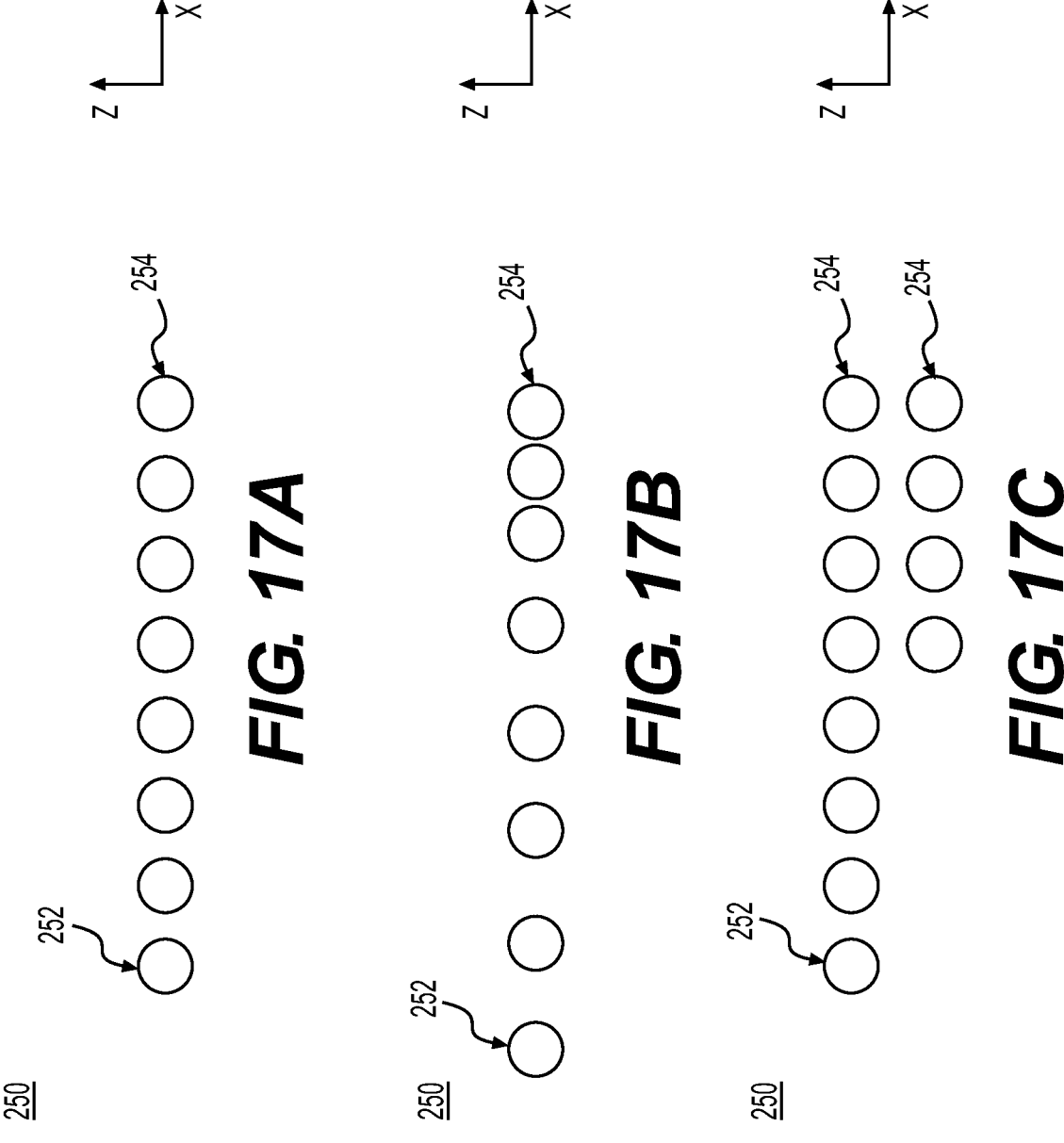

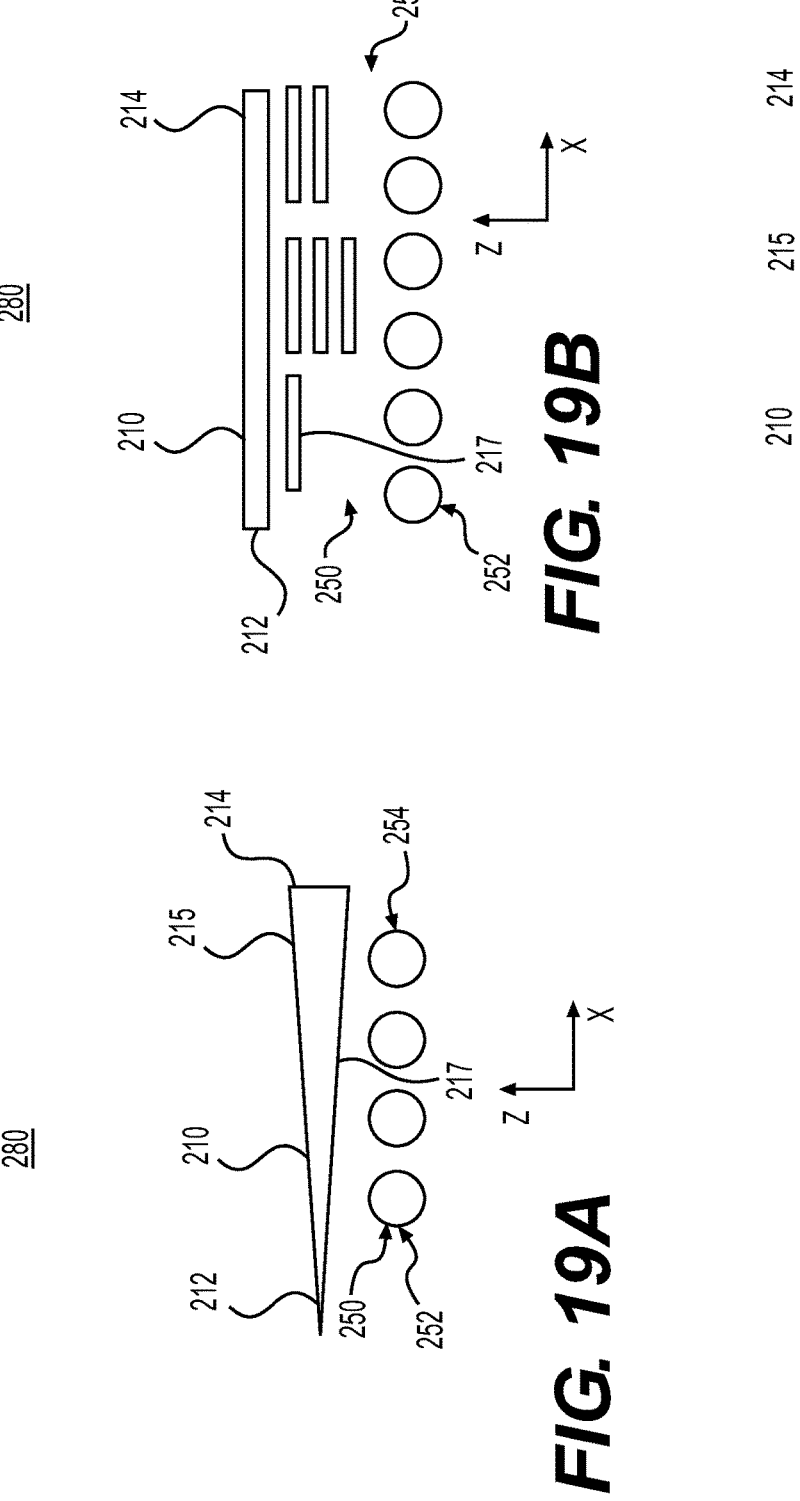
FIG. 19A
FIG. 19B
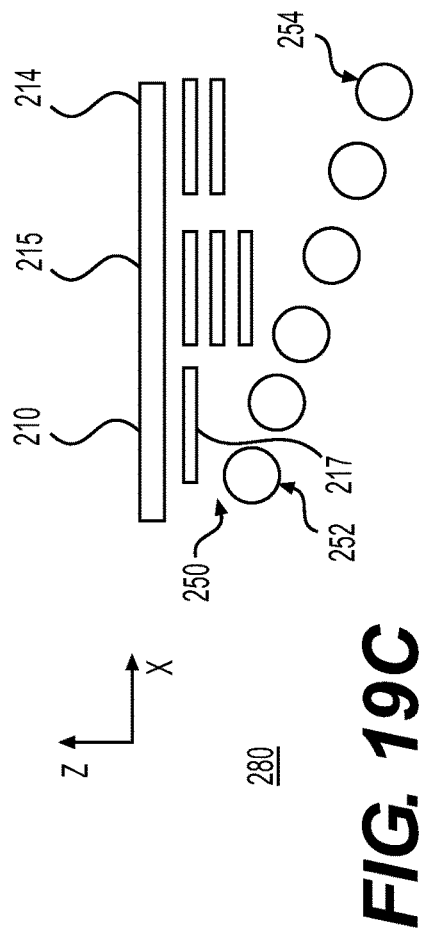
FIG. 19C

TRANSMITTER ASSEMBLY AND METHODS FOR MAKING AND USING THE SAME

CROSS-REFERENCE TO RELATED APPLICATION(S)

This patent application is a continuation of U.S. patent application Ser. No. 17/592,318, filed on Feb. 3, 2022, which claims the benefit of priority to U.S. Provisional Application No. 63/145,901, filed on Feb. 4, 2021, the entireties of which are incorporated herein by reference.

FIELD

The disclosed embodiments relate generally to electromagnetic power transfer and more particularly, but not exclusively, to transmitter assemblies and methods for making and using the same.

BACKGROUND

Electromagnetic power transfer is used in a wide variety of applications, such as wireless charging for vehicles. Electrically powered vehicles are an alternative to traditional gasoline-powered vehicles. Electric vehicles use one or more electric motors, typically powered by batteries for propulsion. The batteries can be charged by one or more sources of electricity. Electric vehicles can be plugged into a specially designed outlet to receive power for charging the batteries or electric vehicles can be wirelessly charged at a charging station.

In existing wireless charging stations for electric vehicles, an inverter receives power and generates electromagnetic (EM) Alternating Current (AC) signal that is supplied to a transmitter. The transmitter uses an induction coil to generate an EM field that wirelessly transmits the electromagnetic power. A second induction coil in a receiver installed in an electric vehicle receives the EM field. The vehicle is parked at a designated location to align the transmitter and the receiver in close vicinity. The receiver coil thus captures the electromagnetic power via induction and transmits the power to the battery via a rectifier. Efficiency of power transmission from the charging station to the receiver is measured via a coupling factor (or "k-factor").

The coupling factor is dependent on a number of different variables. For example, the shape and strength of the EM field is a factor that impacts coupling factor and overall system efficiency. The spatial distribution of the electromagnetic field from a conventional transmitter is not uniform. The electromagnetic field is typically highest at a center of the transmitter coil and reduces at locations farther from the coil center. As a result, the alignment between a transmitter coil and the coil in a car has a significant impact on efficiency. Further, the transmitter generates strong electromagnetic fields and efficiency is lost from EM field that is not directed at the receiver. Misdirected EM field energy can also disadvantageously heat objects near the transmission coil. Accordingly, the transmitter needs to be shielded from the environment in a safe and reliable manner or the power transmitted by the coil needs to be limited to keep it within safe ranges.

In view of the foregoing, there is a need for improvements and/or alternative or additional solutions to construct a transmitter that overcome drawbacks of existing solutions.

BRIEF DESCRIPTION OF THE DRAWINGS

FIG. 16 is an exemplary cross-sectional diagram illustrating an alternative embodiment of the back shield unit of FIG. 3, wherein the secondary inductor includes at least one coil forming a plurality of loops.

FIGS. 17A-17C are exemplary cross-sectional diagrams illustrating alternative embodiments of the secondary inductor of FIG. 16, wherein the loops form one or more rows and are evenly or unevenly spaced.

FIG. 19A-19C are exemplary cross-sectional diagrams illustrating alternative embodiments of the back shield unit of FIG. 16, wherein the secondary inductor and the primary back shield are non-uniformly spaced.

Figure 1:
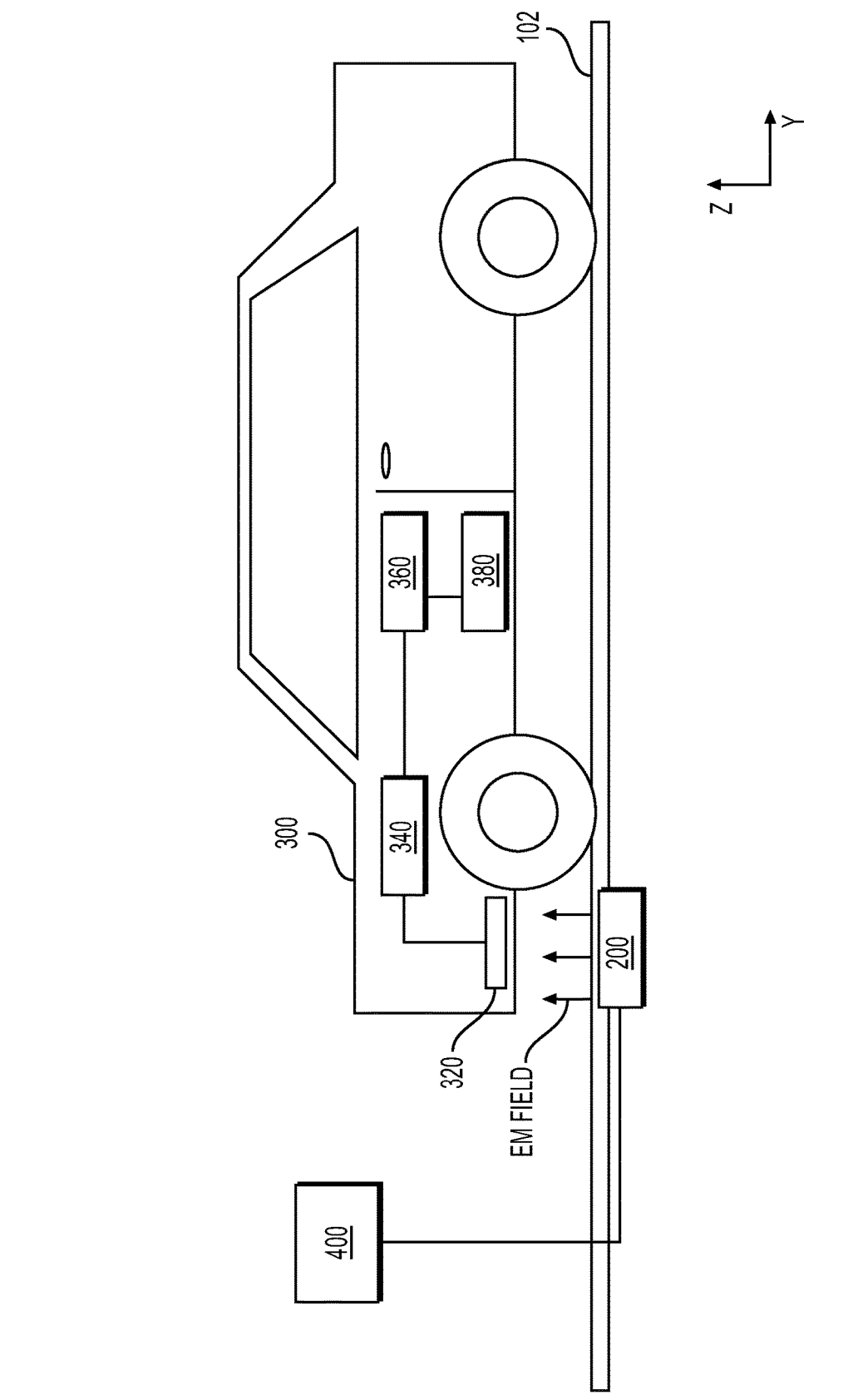
FIG. 1 is an exemplary diagram illustrating an embodiment of a system for wireless charging, the system including a transmitter assembly.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Because currently-available methods and systems for electromagnetic (EM) power transfer are incapable of transmitting power at high efficiency and great uniformity in a safe and reliable manner, systems and method for making and using the same that can overcome the drawbacks as set forth above can prove desirable and provide a basis for a wide range of applications, such as wireless charging stations for electric vehicle or any other applications that requires a controlled spatial distribution of electromagnetic power transmission.

FIG. 1 is an overview of an exemplary wireless charging system 100 where the system of the present disclosure can be employed. In the embodiment shown, an inverter 400 receives electrical power from a power grid (not shown) or another power source and transforms the power into an alternating current (AC) form suitable for wireless transmission by a transmitter assembly (or magnetic power coupling assembly) 200. The transmitter assembly 200 is enclosed in a suitable housing and can include a primary inductor 220 (shown in FIG. 2) for generating and radiating an EM energy field. A vehicle 300, such as a car, is shown as being positioned such that a receiver 320 is placed in relatively close proximity to the transmitter assembly 200. The receiver 320 is, thereby, able to obtain energy from the transmitter assembly 200. The receiver 320 captures the electromagnetic energy via induction and transmits the energy to a battery 380 via a rectifier 340 in accordance with instruction from an optional energy management system 360. The vehicle 300 can include additional and/or alternative components, which may include energy storage components such as a lithium ion battery system, a super-capacitor storage bank, a fly-wheel, or other known or hereto for undiscovered systems.

In some embodiments of the disclosed system, the transmitter assembly 200 can be positioned flush with a driving surface 102. Stated somewhat differently, the transmitter assembly 200 can have a planar shape and define a coordinate system where the transmitter assembly 200 is parallel to an x-y plane and perpendicular to z direction. When the transmitter assembly 200 is flush with the driving surface 102 and transmits the EM energy skyward to the vehicle 300, for example, the z direction is parallel to the skyward direction and the x-y plane is parallel to the driving surface 102.

In additional and/or alternative embodiments, the transmitter assembly 200 can be positioned below the driving surface 102, positioned such that the transmitter assembly 200 extends from the driving surface 102, positioned on a wall (not shown) adjacent to the driving surface 102, or suspended above the driving surface 102.

Figure 2:
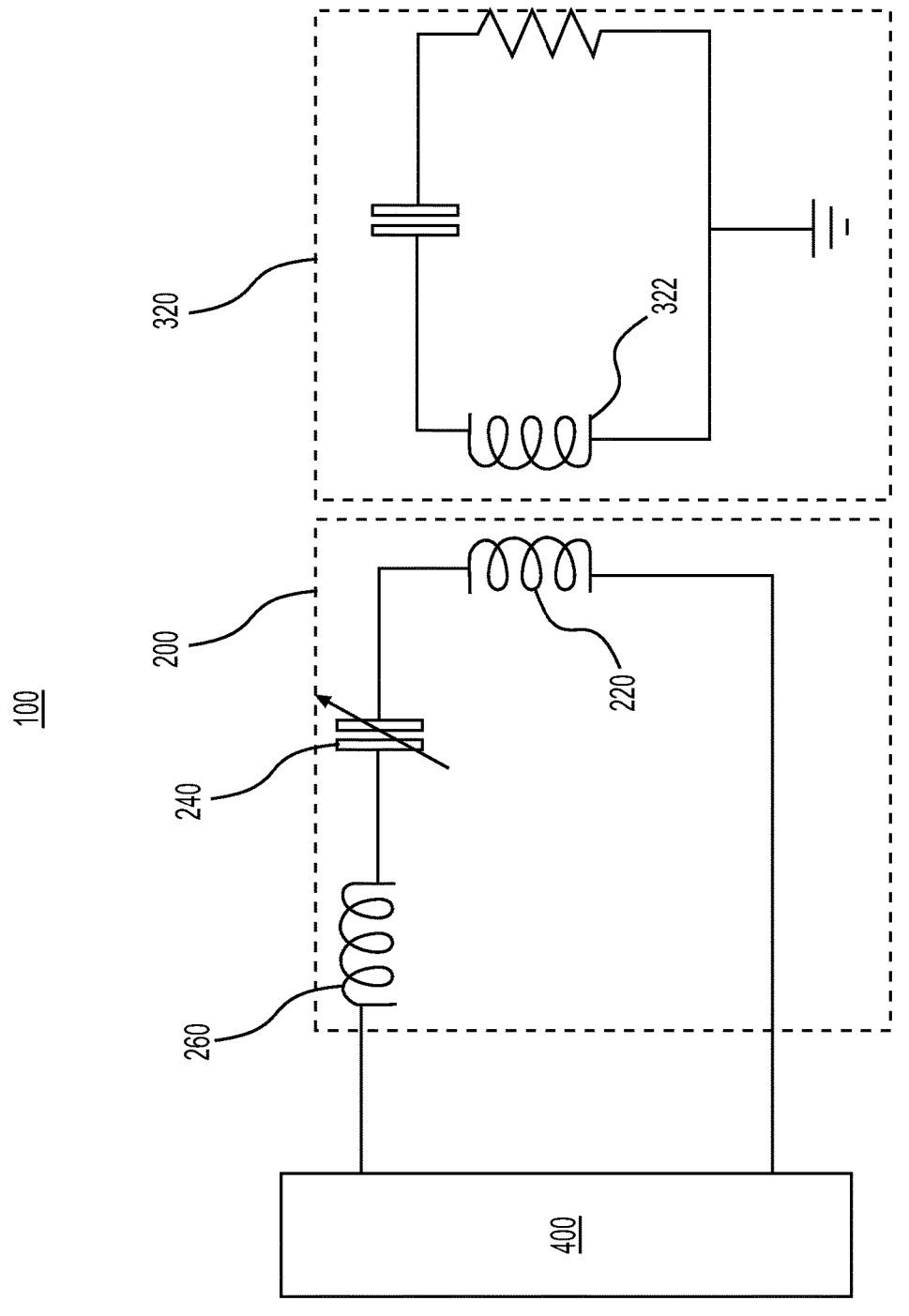
FIG. 2 is an exemplary circuit diagram illustrating an embodiment of the system of FIG. 1.

Turning to FIG. 2, an exemplary circuit diagram of the system 100 is shown. The transmitter assembly 200 is shown as including the primary inductor 220 connected to an optional capacitor unit 240 configured to tune impedance of the transmitter assembly 200 and accordingly adjust an output power of the primary inductor 220. The primary inductor 220 is shown as being connected to an optional supplemental inductor unit 260 configured to further tune impedance of the transmitter assembly 200.

The receiver 320 is shown as including a receiving inductor coil 322 configured to capture the AC power from the transmitter assembly 200 via inductive coupling with the primary inductor 220.

The transmitter assembly 200 is shown as being connected to the inverter 400. The inverter 400 is described in detail in United States patent application "SYSTEM AND METHOD FOR PHASE-CONTROLLED POWER SUPPLY", filed contemporaneously herewith. The inverter 400 can be buried underground and can be configured to transform direct current (DC) power from a power station (not shown) into AC power to be applied to the transmitter assembly 200. The ability to efficiently transmit energy between the primary inductor 220 and the receiving inductor coil 322 is dependent upon, among other things, the alignment between the coils in the x, y, and z directions as well as pitch and yaw differences between the primary inductor 220 and the receiving inductor coil 322. The receiving inductor coil 322 is typically located on the underside of the vehicle 300 and, in the real world, can be difficult to perfectly align with the primary inductor 220. Efficient transmission in these situations of imperfect alignment can be enhanced by adjusting the capacitance of the transmitting circuit. Accordingly, in one advantageous embodiment of the transmitting circuit, the optional capacitor unit 240 includes a variable capacitance component or circuit.

Figure 3:
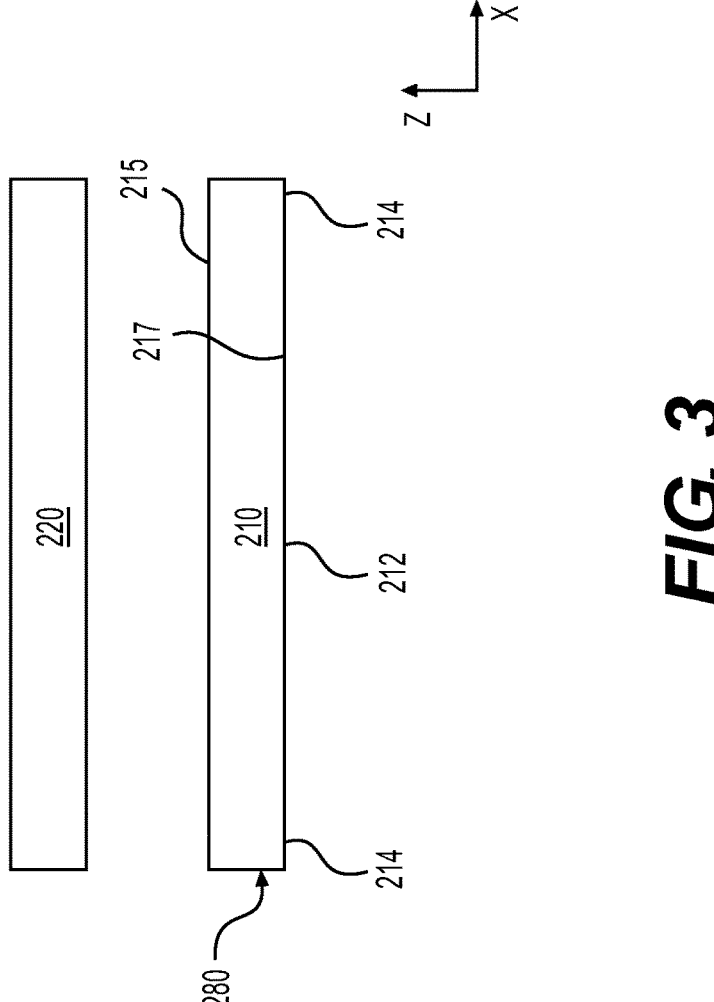
FIG. 3 is an exemplary diagram illustrating an embodiment of the transmitter assembly of FIG. 1, wherein the transmitter assembly includes a back shield unit.

Turning to FIG. 3, the transmitter assembly 200 is shown as including a back shield unit 280 positioned in proximity to the primary inductor 220 and below the primary inductor 220 when oriented in a manner as in the system 100 (shown in FIG. 1). The back shield unit 280 is configured to reduce stray electromagnetic radiation from the primary inductor 220 to the environment. In one embodiment, the back shield unit 280 can block and/or redirect an electric field emanating from the primary inductor 220. Additionally and/or alternatively, the back shield unit 280 can re-direct magnetic flux from the primary inductor 220 and provide a path for the flux to route proximally to the primary inductor 220.

FIG. 3 shows the back shield unit 280 as including a primary back shield 210. The primary back shield has a first surface 215 proximal to the primary inductor 220 and a second surface 217 opposite to the first surface 215. In one embodiment, the primary back shield 210 can be at least partially made of a material with high magnetic permeability, such as ferrite. The material can be a hard and/or soft ferromagnetic material. Thus, the primary back shield 210 can capture magnetic flux and at least partially prevent the magnetic flux from leaking down into the ground.

Figure 4:
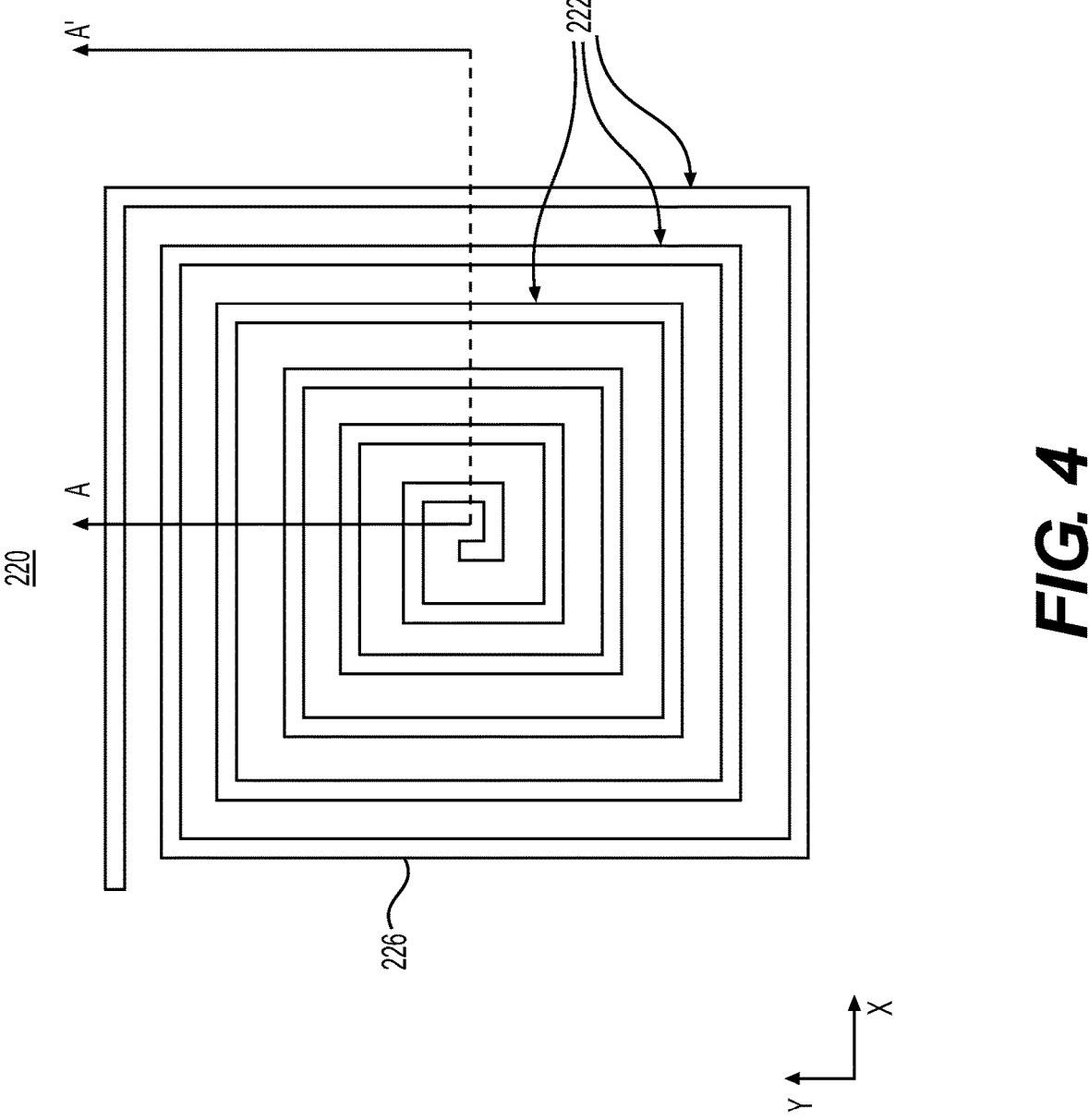
FIG. 4 is an exemplary diagram illustrating an embodiment of a primary inductor of the back shield unit of FIG. 3.

Turning to FIG. 4, the primary inductor 220 is shown as including at least one coil 226. The coil 226 is shown as laying out in a planar spiral pattern to form one or more loops 222. Advantageously, the planar shape can improve simplicity of packaging the transmitter assembly 200 (shown in FIG. 1). The coil 226 can be made of any suitably conductive material and is preferably made from insulated copper. The particular shape and composition of the coil can be selected to suit the needs of the particular application.

Although FIG. 4 shows the coil 226 as forming the loops 222 located in one plane that is parallel to the x-y plane for illustrative purposes only, the loops 222 formed by each of the coils 226 can be in one or more uniform and/or different planes, without limitation. Stated somewhat differently, the loops 222 can be arranged in one or more layers that are stacked.

Although FIG. 4 shows the primary inductor 220 as including one coil 226 for illustrative purposes only, the primary inductor 220 can include one or more uniform and/or different coils 226, without limitation. The coils 226 can be arranged in any suitable manner including, for example, positioned in array(s) and/or stacked.

Although FIG. 4 shows a distance between two neighboring (or adjacent) loops 222 as being uniform for illustrative purposes only, the distance can vary at different locations of the gap between the two neighboring loops 222.

Although FIG. 4 shows each two neighboring loops 222 as being uniformly spaced for illustrative purposes only, distances between each two neighboring loops 222 can be uniform and/or different, without limitation. Stated somewhat differently, the loops 222 can be evenly and/or unevenly spaced or distributed.

Advantageously, the loops and/or the coils 226 can be arranged in a selected configuration to product the EM field with a desired spatial distribution. For example, the EM field can be increased by increasing the number of stacks formed with the loops 222, and/or by decreasing the distance between the loops 222.

Figures 5A, 5B, 5C:
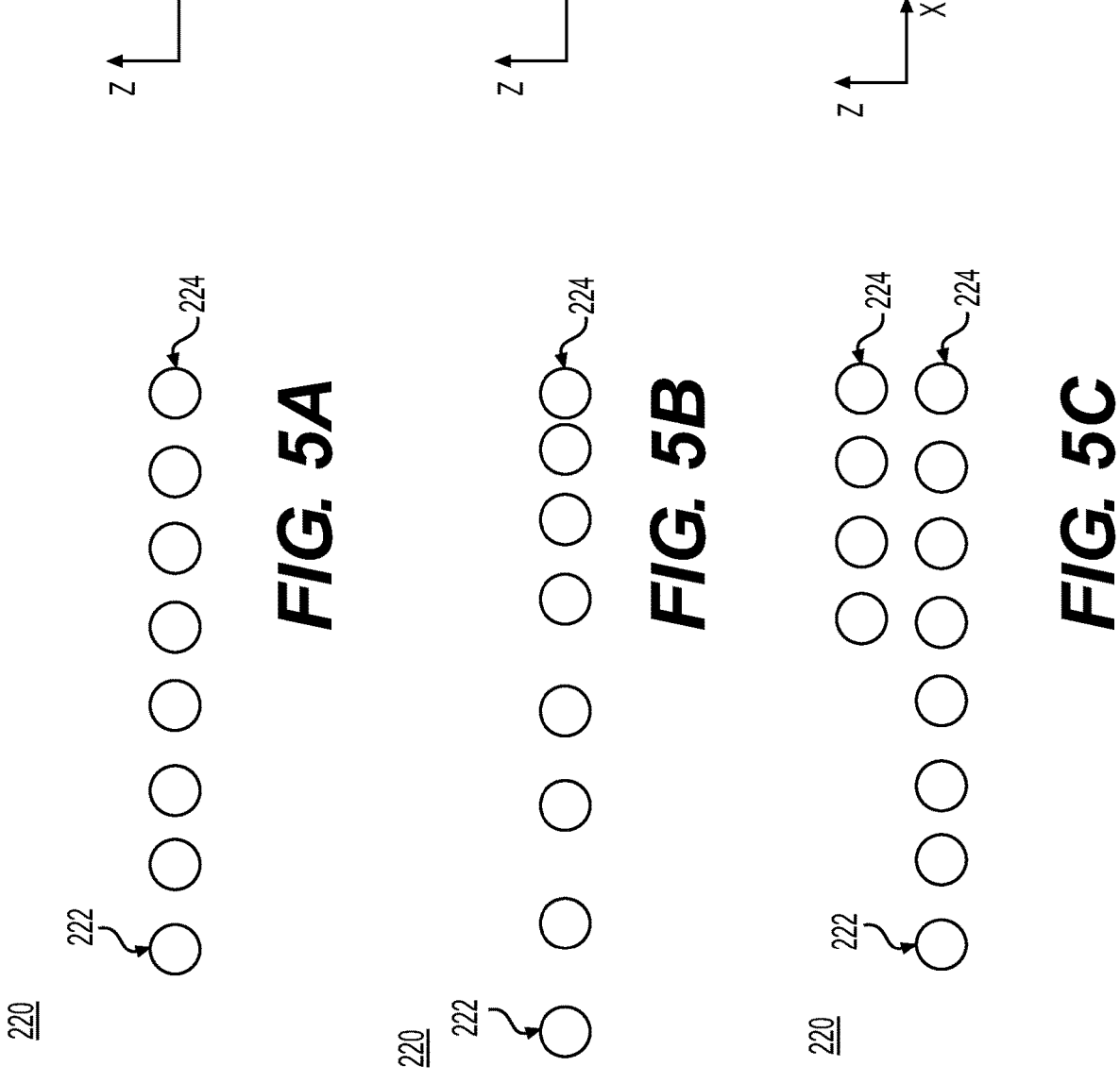
FIGS. 5A-5C are exemplary cross-sectional diagrams illustrating alternative embodiments of the primary inductor of FIG. 4.

FIGS. 5A-5C show cross-sectional diagrams of the loops 222 along a line AA' (shown in FIG. 4). FIG. 5A shows the loops 222 as being arranged in a row (or layer) 224 and evenly spaced. FIG. 5B shows the loops 222 as being arranged in a row and unevenly spaced. Stated somewhat differently, the distance between two neighboring loops 222 at a perimeter region of the primary inductor 220 can be smaller than the distance between two neighboring loops 222 at a center region of the primary inductor 220. FIG. 5C shows the loops 222 as being arranged in one row 224 at the center region of the primary inductor 220 and in two rows 224 at the perimeter region of the primary inductor 220. Stated somewhat differently, the number of the rows 224 of the loops 222 at the perimeter region of the primary inductor 220 can be greater than the number of the rows 224 at the center region of the primary inductor 220.

Figure 6:
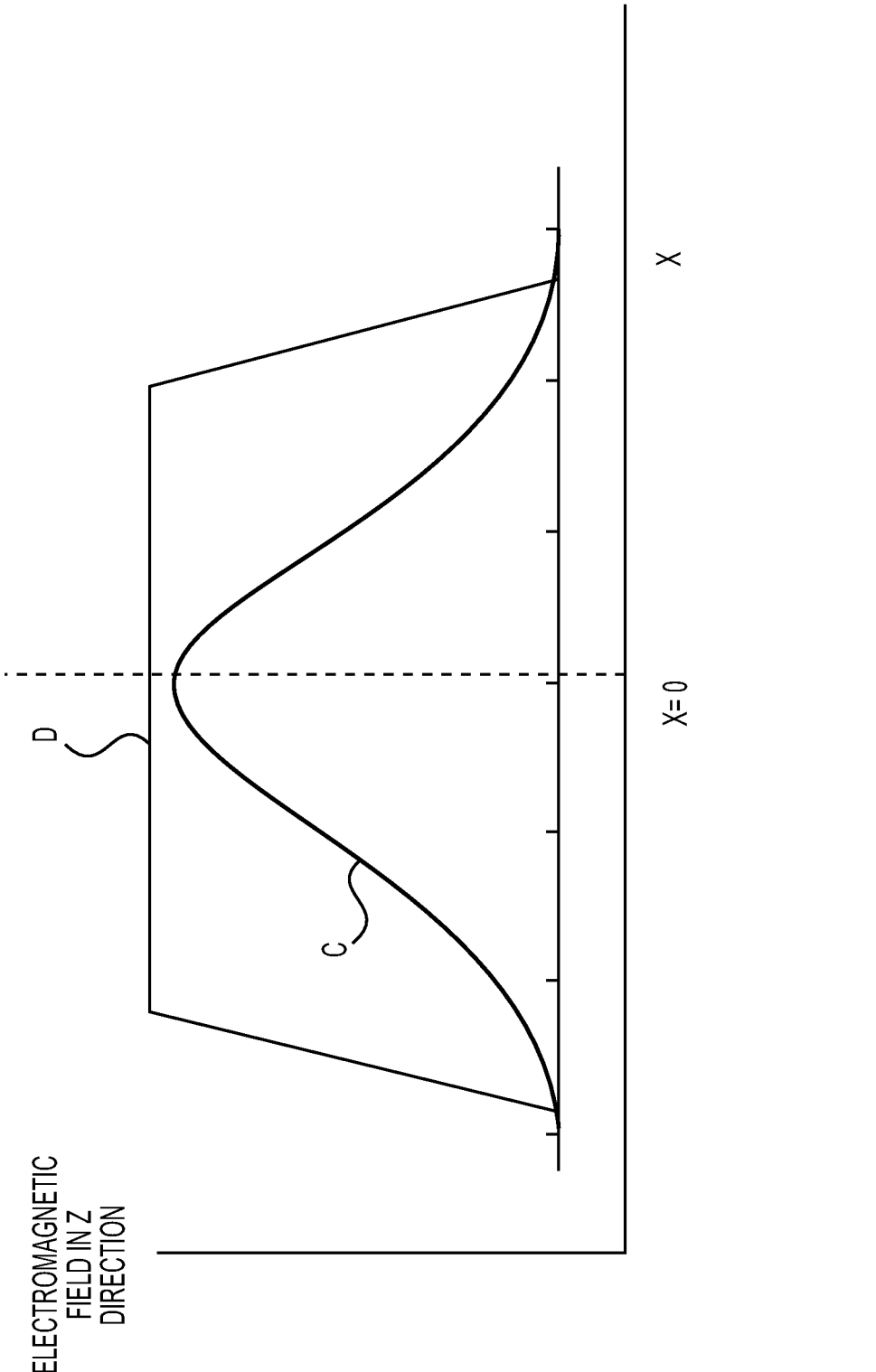
FIG. 6 is an exemplary diagram illustrating a spatial distribution of EM fields of the system of FIG. 1.

Turning to FIG. 6, spatial distributions (or spatial profiles) of the electromagnetic field respectively transmitted from a conventional transmitter and the transmitter assembly 200 (shown in FIG. 3) is shown. For a conventional transmitter, the electromagnetic field peaks at a center of a conventional transmitter in the x-y plane and decays with increase of distance from the center, as illustratively shown by curve C. However, by using a selected configuration of the primary inductor 220 of the transmitter assembly 200, and/or other components of the transmitter assembly 200 as set forth in the present disclosure, the non-uniform distribution can be improved and, for example, preferentially increase at the outer perimeter region of the transmitter assembly 200. Thus, the spatial distribution of the electromagnetic field generated by the transmitter assembly 200 can be more uniform and become similar to a broad and uniform distribution as illustratively shown by a curve D. This arrangement improves overall parking alignment tolerances of the system 100 (shown in FIG. 1). Further, lost energy can be recovered and increase coupling efficiency of the system 100.

Figure 7:
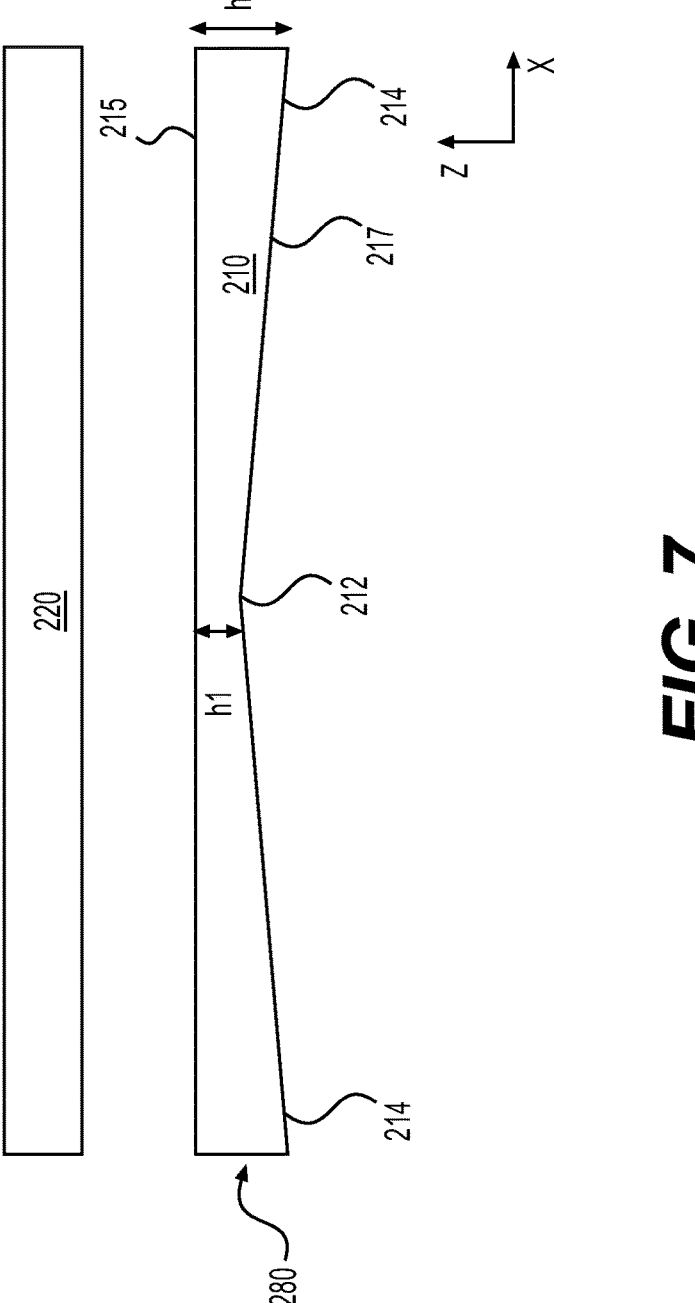
FIG. 7 is an exemplary cross-sectional diagram illustrating an alternative embodiment of the transmitter assembly of FIG. 3, wherein the back shield unit includes a primary back shield having a non-uniform thickness.

Turning to FIG. 7, the primary back shield 210 is shown as having a thickness, measured in the z direction, that is non-uniformly distributed from a center region 212 of the primary back shield 210 to an outer perimeter region 214 of the primary back shield 210. Stated somewhat differently, the thickness is shown as being h1 and h2 at the center region 212 and the outer perimeter region 214, respectively, with h1 and h2 being different. FIG. 7 shows h1 as being smaller than h2. Advantageously, in response to the stray magnetic field transmitted from the primary inductor 220, a secondary EM field generated by the outer perimeter region 214 can be enhanced. This allows the nonuniform spatial distribution of the electromagnetic field transmitted from the transmitter assembly 200 to be compensated and become more uniform. In other words, the shape of the primary back shield 210 can be tailored to correspond to the shape of the EM field generated by the coil, which can enhance overall uniformity of the transmitted field. In one embodiment, the coupling factor can be proportional to the thickness of the primary back shield 210. In another embodiment, multiple layers, each of which may have varying depths relative to one another, may be configured to form a magnetic material operable to generate a coupling factor between a transmitter (e.g. transmitter assembly 200) and a receiver coil (e.g. coil 226) that provides an improved concentration of the magnetic field.

The nonuniform spatial distribution of the electromagnetic field can also be improved to a certain extent via modifying only the primary inductor 220, for example, by arranging the loops 222 (shown in FIG. 5A-5C) into a non-linearly shaped profile (such as a parabolic shape rising in the z-axis) or non-uniform thickness. However, such modification cannot be implemented practically because the loops 222 need to be arranged to span across a significant distance in z direction to achieve the uniformity needed for wireless charging. Such span in z direction when used to its full extent can create a generally disadvantageous thickness to the overall device and limits the compact packaging of the transmitter assembly 200. In contrast, the primary back shield 210 can enhance the uniform distribution of the electromagnetic field while maintaining a thin profile of the primary inductor 220 and the transmitter assembly 200 under packaging restraints.

The thickness of the primary back shield 210 is shown as varying from the center region 212 to the outer perimeter region 214 according to a linear profile. Stated somewhat differently, at a plurality of points along the first surface 215 (or the second surface 217) of the primary back shield 210, the thicknesses of the primary back shield 210 is a linear function of the positions of the points. The linear function is a straight line when graphically presented.

Figure 8:
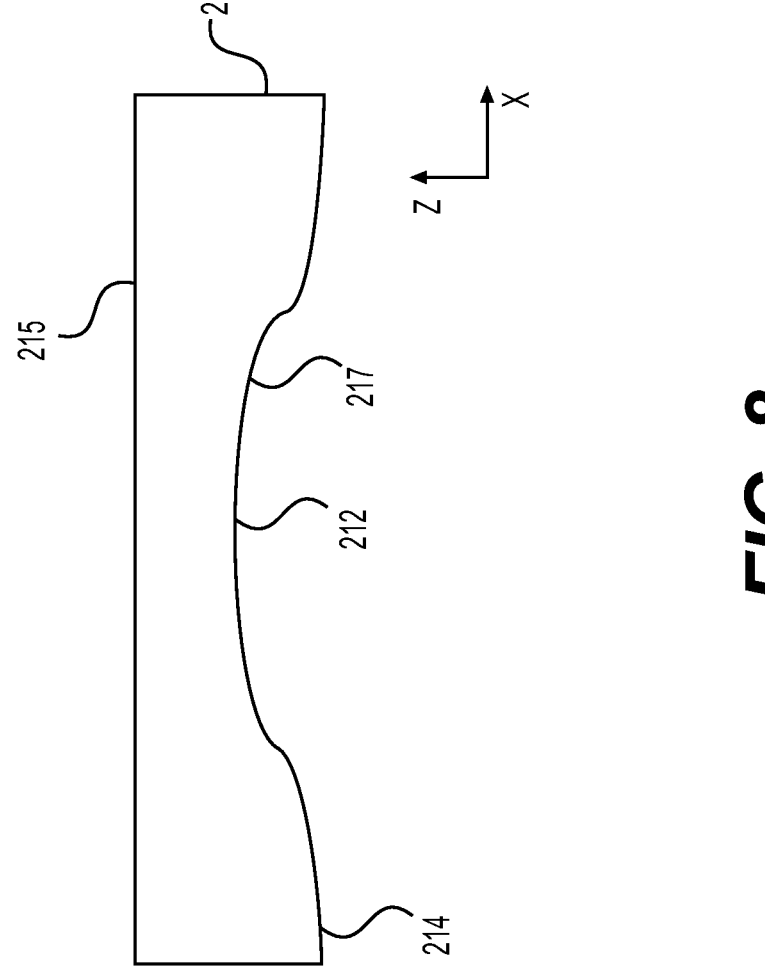
FIG. 8 is an exemplary cross-sectional diagram illustrating an alternative embodiment of the primary back shield of FIG. 7, wherein the thickness of the primary back shield varies in accordance with a non-linear profile.

Turning to FIG. 8, the thickness of the primary back shield 210 is shown as varying from the center region 212 to the outer perimeter region 214 at least partially according to a non-linear profile. Stated somewhat differently, at a plurality of points along the first surface 215 (or the second surface 217) of the primary back shield 210, the thicknesses of the primary back shield 210 is a non-linear function of the positions of the points. An exemplary non-linear function can be polynomial, exponential, logarithmic, or a combination thereof. When graphically presented, the exemplary non-linear function is a curve, polyline, or a combination thereof. Advantageously, the primary back shield 210 can generate the secondary EM field with any type of spatial profile to effectively compensate for, and improve the uniformity of, the spatial profile of the EM field.

Figure 9:
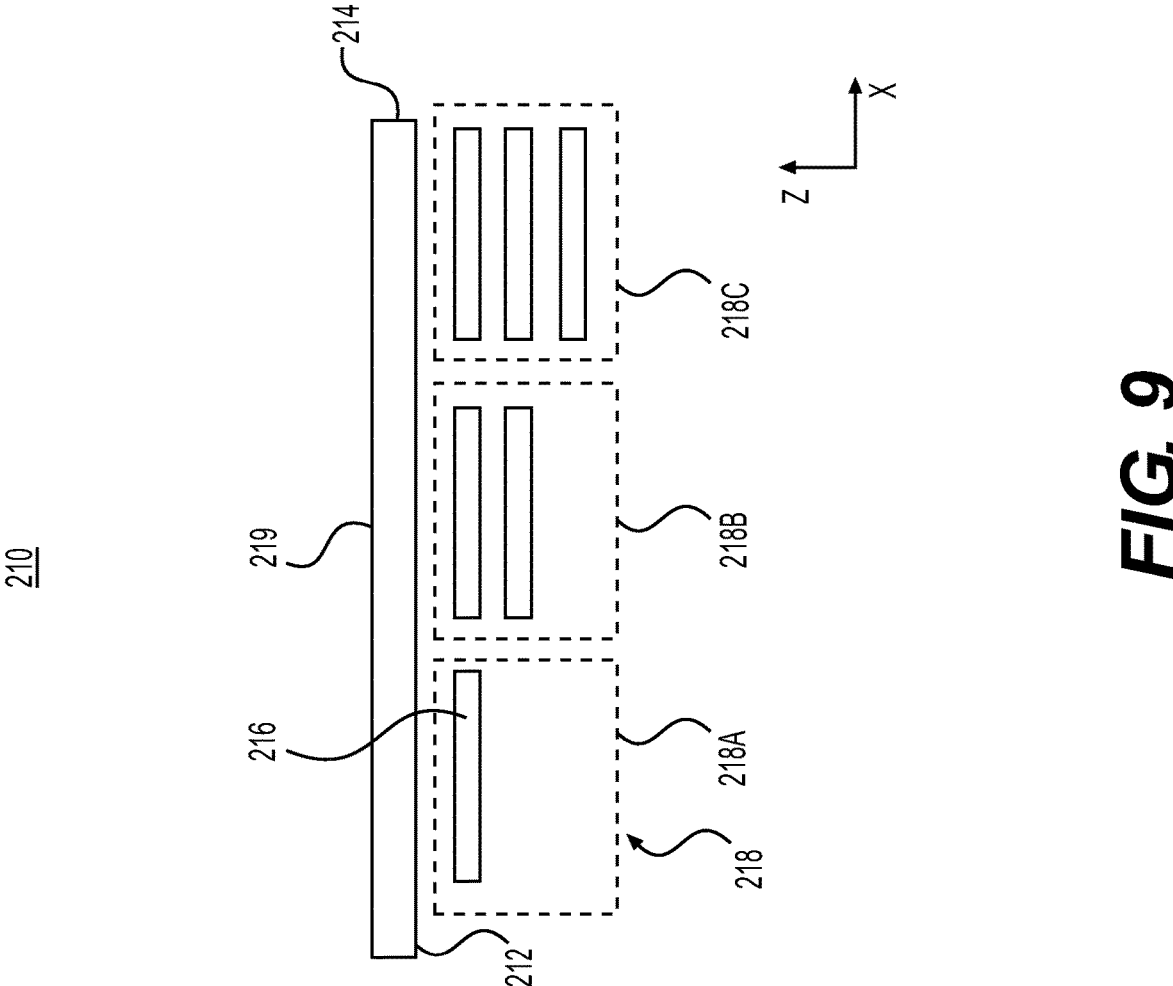
FIG. 9 is an exemplary cross-sectional diagram illustrating another alternative embodiment of the primary back shield of FIG. 7, wherein the primary back shield includes a plurality of stacks of tiles.

Turning to FIG. 9, the primary back shield 210 is shown as including a plurality of stacks 218 each including one or more tiles 216. The stacks 218 are illustratively shown as including stacks 218A, 218B and 218C. The thickness of the primary back shield 210 can be equal to the thickness of the stack 218, or the total thickness of the tiles 216 in the stack 218. Stated somewhat differently, the thickness of the primary back shield 210 can vary from the center region 212 to the outer perimeter region 214 according to a function or profile, the function being the thickness of the stacks 218 with respect to the x (or y) coordinates defining the positions of the stacks 218. The thickness of the primary back shield 210 is shown as varying from the center region 212 to the outer perimeter region 214 according to a linear profile. The number of tiles 216 of each stack 218 can increase monotonically and at a constant slope (or rate) of increase from the center region 212 to the outer perimeter region 214.

If tiles 216 are not used, the primary back shield 210 can be one or more large sheets matching the large size of the primary inductor 220. Large sheet, however, can be mechanically brittle and break easily. The tiles 216 advantageously avoid these issues and provided significant mechanical robustness and allow for overall structurally flexibility when housed in a shield base 211 (shown in FIG. 11).

The tiles 216 within each stack 218 is shown as having a spacing therebetween for illustrative purposes. The tiles 216 can be spaced apart by being coated with a non-conductive paint, being each housed in an individual cavity within a housing made of an insulator, such as a plastic. Additionally and/or alternatively, the tiles 216 within each stack 218 can be in direct contact.

Further, when the thickness of the primary back shield 210 has the linear profile (shown in FIG. 7) and is made of a single piece of ferromagnetic material, the primary back shield 210 can be expensive to manufacture because a wedge-shaped piece of ferromagnetic material can be difficult to make. By using the tiles 216, the thickness of the primary back shield 210 can have the linear profile and be easier and less expensive to manufacture. The primary back shield 210 is shown as including an optional floor layer 219 that spans partially across the stacks 218 and parallel to the tiles 216. The floor layer 219 can be made of a ferromagnetic material that is same as and/or different from the tiles 216. The floor layer 219 can provide a minimum thickness of the primary back shield 210 and can be a uniform sheet that is inexpensive to make. Advantageously, the tiles 216 can achieve varied thickness of the primary back shield 210 while the floor layer 219 can reduce the number of the tiles 216 and simplify the manufacture of the primary back shield 210. Moreover, while uniformly shaped tiles are shown in the figures, tiles of different sizes and shapes can be advantageously employed to create desired magnetic profiles.

Figure 10:
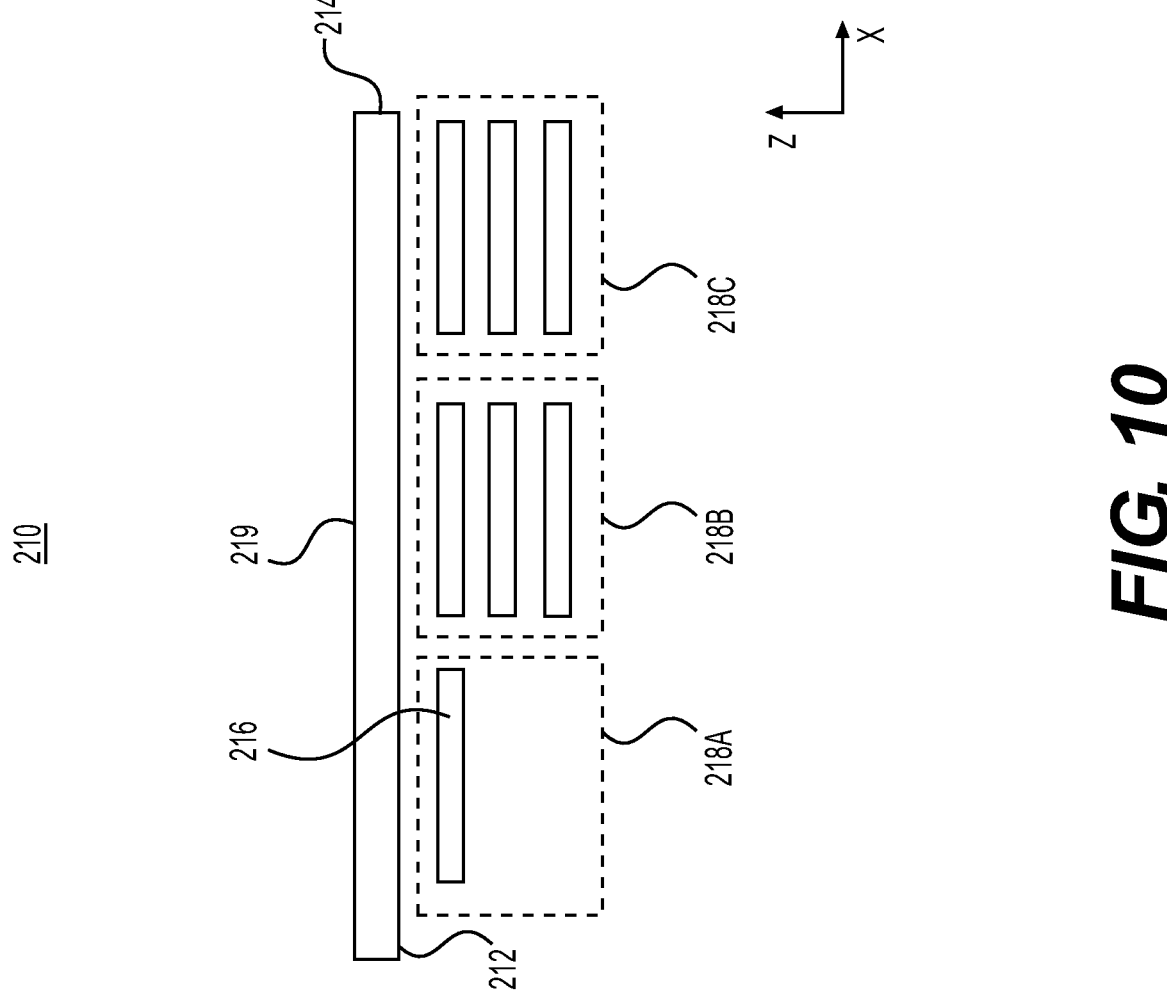
FIG. 10 is an exemplary cross-sectional diagram illustrating an alternative embodiment of the primary back shield of FIG. 9, wherein the thickness of the primary back shield varies in accordance with a non-linear profile.

Turning to FIG. 10, the primary back shield 210 is shown as including the plurality of stacks 218 each including the one or more tiles 216. The thickness of the primary back shield 210 is shown as varying from the center region 212 to the outer perimeter region 214 at least partially according to a non-linear profile.

Further, when the thickness of the primary back shield 210 has the non-linear profile (shown in FIG. 8) and is made of a single piece of ferromagnetic material, the primary back shield 210 can be expensive to manufacture because a non-linear-shaped piece of ferromagnetic material can be difficult to make. By using the tiles 216, the thickness of the primary back shield 210 can have the non-linear profile and be easier and less expensive to manufacture.

Figure 11:
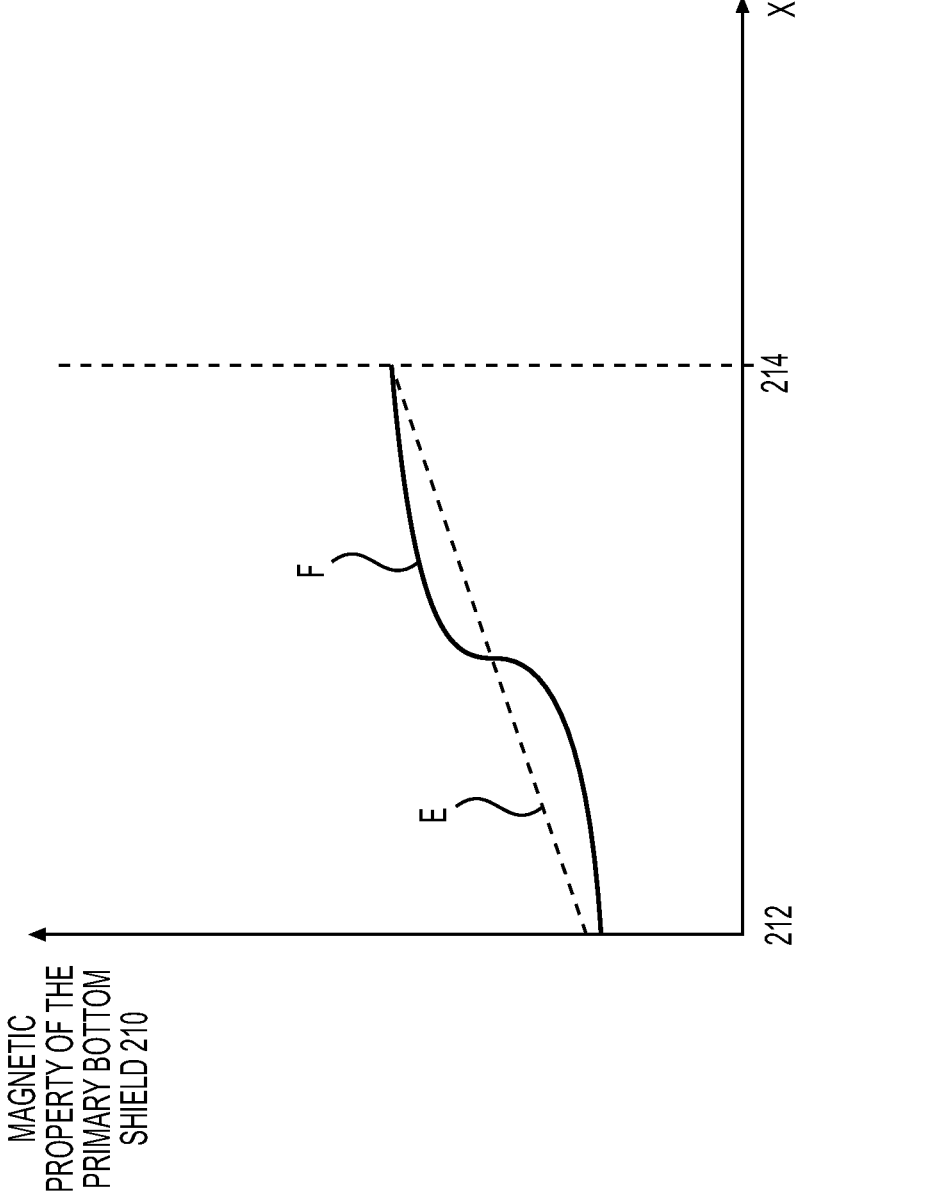
FIG. 11 is an exemplary diagram illustrating spatial distributions of a magnetic property of a primary back shield of FIG. 3.

Turning to FIG. 11, additionally and/or alternatively, the primary back shield 210 is shown as having a non-uniform magnetic property. An exemplary magnetic property can include the magnetic permeability. The magnetic permeability is shown as being lower at the center region 212 and higher at the outer perimeter region 214. Advantageously, in response to the stray magnetic field transmitted from the primary inductor 220 (shown in FIG. 3), a secondary EM field generated by the outer perimeter region 214 can be enhanced. The nonuniform spatial distribution of the electromagnetic field can be compensated and become more uniform.

The magnetic property can have a non-uniform spatial distribution from the center region 212 to the outer perimeter region 214 according to a linear profile, shown as line E for illustrative purposes. At a plurality of points along the first surface 215 shown in FIG. 3 (or the second surface 217 shown in FIG. 3) of the primary back shield 210, the magnetic property of the primary back shield 210 is a linear function of the positions of the points. The linear function is a straight line when graphically presented.

The magnetic property of the primary back shield 210 can vary from the center region 212 to the outer perimeter region 214 at least partially according to a non-linear profile, shown as curve F for illustrative purposes. Specifically, at a plurality of points along the first surface 215 (or the second surface 217) of the primary back shield 210, the magnetic property of the primary back shield 210 is a non-linear function of the positions of the points. Advantageously, even if the primary back shield 210 has a uniform thickness, the primary back shield 210 can generate the secondary EM field with a desired spatial profile to effectively compensate for, and improve the uniformity of, the spatial profile of the EM field transmitted from the transmitter assembly 200 (shown in FIG. 3).

The primary back shield 210 can be made of a single piece of solid that is made of a combination of materials having respective magnetic properties. Additionally and/or alternatively, the primary back shield 210 can include the stacks 218 (shown in FIGS. 9 and 10) of the tiles 216 (shown in FIGS. 9 and 10). Each tile 216 can be made of one or more materials having selected magnetic properties, respectively, such that the stacks 218 can have respective effective magnetic properties. In some embodiments, each of the tiles 216 may have a substantially similar magnetic permeability relative to one another, while in other embodiments tiles 216 may have a different magnetic permeability than one another. The primary back shield 210 can have the magnetic property varying in accordance with a selected spatial profile. Advantageously, even if the stacks 218 have a uniform number of tiles 216, the primary back shield 210 can generate the secondary EM field with a desired spatial profile to effectively compensate for, and improve the uniformity of, the spatial profile of the EM field transmitted from the transmitter assembly 200.

Figure 12:
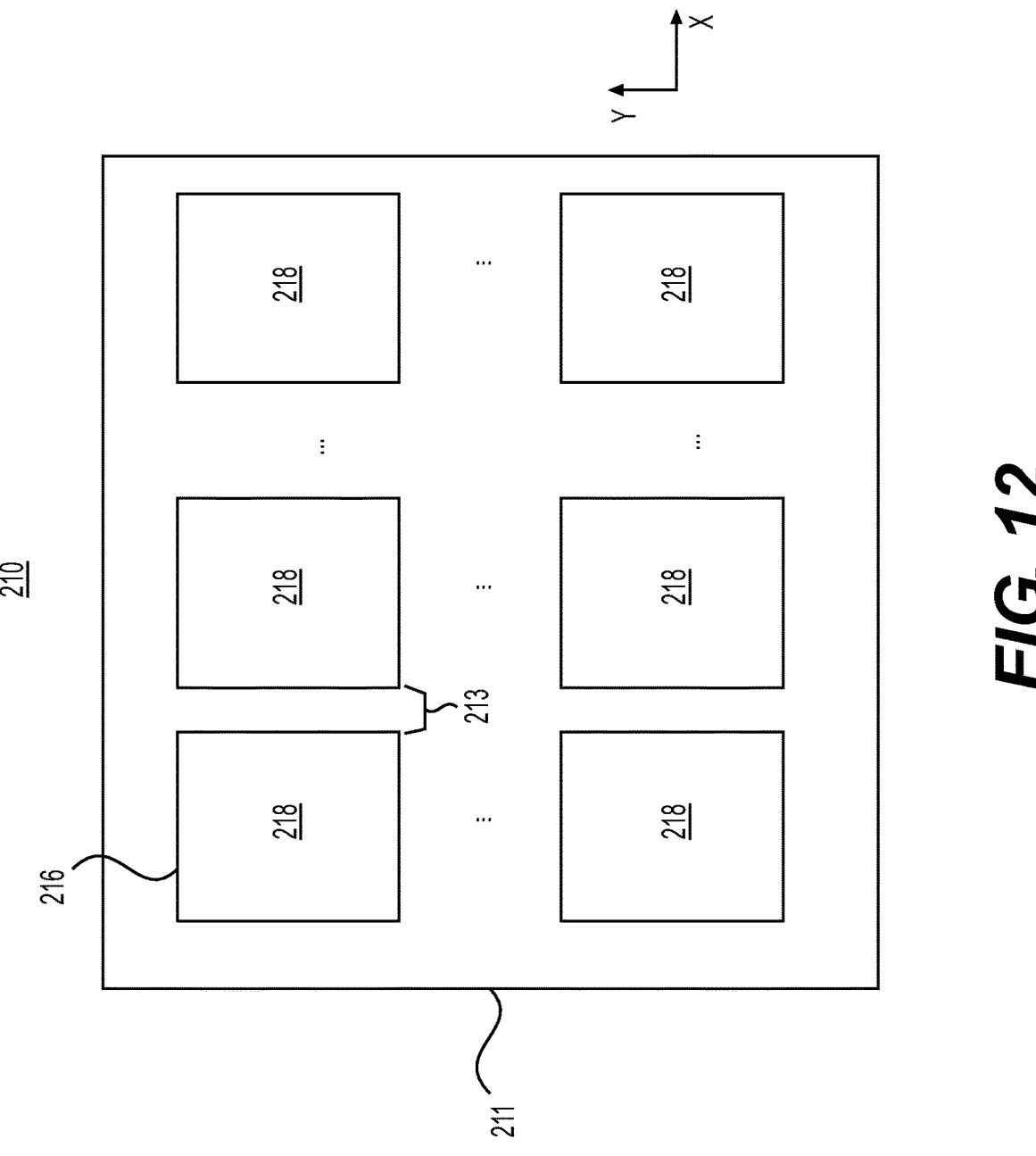
FIG. 12 is an exemplary diagram illustrating an alternative embodiment of the primary back shield of FIG. 9, wherein the primary back shield includes a shield base for housing the tiles.

Turning to FIG. 12, the primary back shield 210 is shown as including the plurality of stacks 218 arranged in an array. FIG. 12 further shows a shield base 211 for housing the stacks 218. The shield base 211 can be made of a material that is electromagnetically insulating. In one embodiment, the shield base 211 can be shaped as a planar tray with concaved slots that fit each of the stacks 218. The tiles 216 of neighboring stacks 218 can be contiguous, semi-contiguous, disconnected, or a combination thereof. The shield base 211 is shown as including optional spacers 213 to at least partially separate every two neighboring stacks 218. The spacer 213 can optionally fill space between every two neighboring stacks 218 and achieve insulation therebetween. In one embodiment, the shield base 211 and/or the spacer 213 can be made of an insulator such as a plastic material. The spacer 213 is advantageously made small relative to the size of the tiles 216. This shield base 211, can be made via injection molding, additive process such as 3D printing, or through milling. The spacers 213 can also be formed from an insulative tape wrapped around the tiles, an insulative paint applied to the edge of the tile, and/or an epoxy used to coat the tiles.

The tiles 216 exposed to EM field can generate eddy currents. The eddy currents can result in high voltage around edges of the tiles 216. Without the spacers 213, the high voltage can generate electric sparks between neighboring tiles 216. The sparks can result in deterioration of the tiles 216 and erode the tiles 216 over time. The sparks can also result in loss of efficiency, heat generation, fire hazard and reduction of overall life of the transmitter assembly 200 (shown in FIG. 1). The inventor of the present application has considered coating the tiles 216 in non-conductive paint, but the paint can be damaged and lost when the tiles 216 rub against each other and the electric sparks can still be generated.

In contrast, the spacer 213 as set forth above can ensure a uniform distance between the tiles 216 in neighboring stacks 218 and can improve efficiency of the transmitter assembly 200 and extend lifetime of the primary back shield 210. Exemplary spacing between the stacks 218 can be as small as possible and, optionally, with a minimum limit set based on Industrial Personal Computer (IPC) electric spacing rule.

Figure 13A:
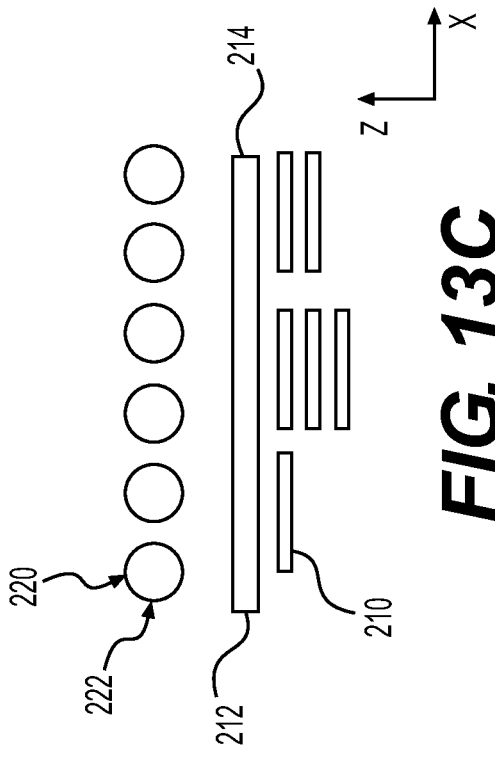
FIGS. 13A-13C are exemplary cross-sectional diagrams illustrating alternative embodiments of the transmitter assembly of FIG. 3, wherein the primary back shield and the primary inductor are uniformly spaced.
Figure 13B:
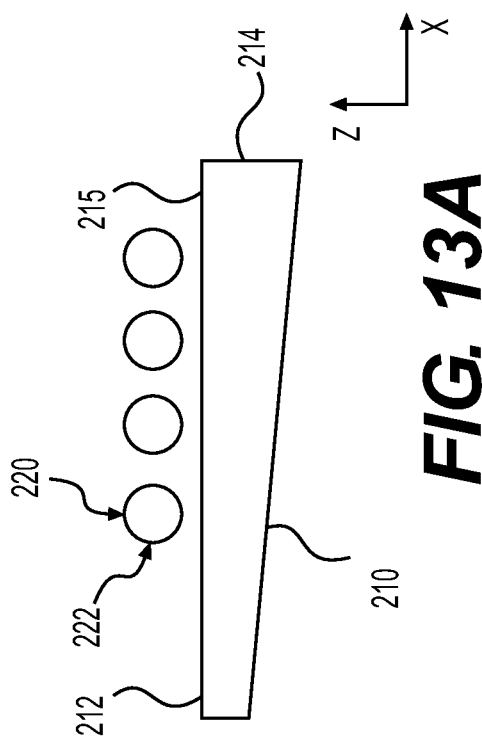
Figure 13C:
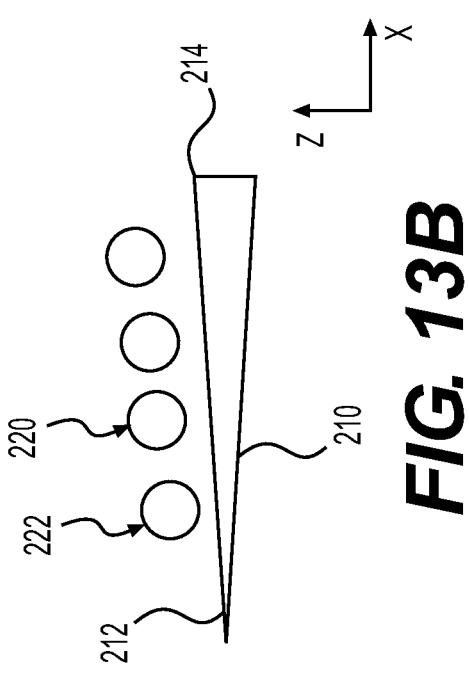

FIG. 13A-13C illustrate exemplary cross-sectional diagrams of the primary back shield 210 and the primary inductor 220, wherein the loops 222 have a constant distance from the primary back shield 210. The percentage of decay of the strength of the EM field that the primary inductor 220 exerts on surface of the primary back shield 210 can thus be independent from the location along the surface. FIG. 13A shows the loops 222 of the primary inductor 220 as being arranged in a row 224 parallel to the x-y plane and the primary back shield 210 as having the first surface 215 parallel to the x-y plane. The thickness of the primary back shield 210 is shown as varying according to a linear profile.

FIG. 13B shows the loops 222 of the primary inductor 220 as being arranged in a row 224 having a constant slope relative to the x-y plane and the primary back shield 210 as having the same constant slope relative to the x-y plane.

FIG. 13C shows the loops 222 of the primary inductor 220 as being arranged in a row 224 parallel to the x-y plane and the primary back shield 210 as having the first surface 215 parallel to the x-y plane. The thickness of the primary back shield 210 is shown as varying according to a non-linear profile.

Figures 14A, 14B, 14C, 14D:
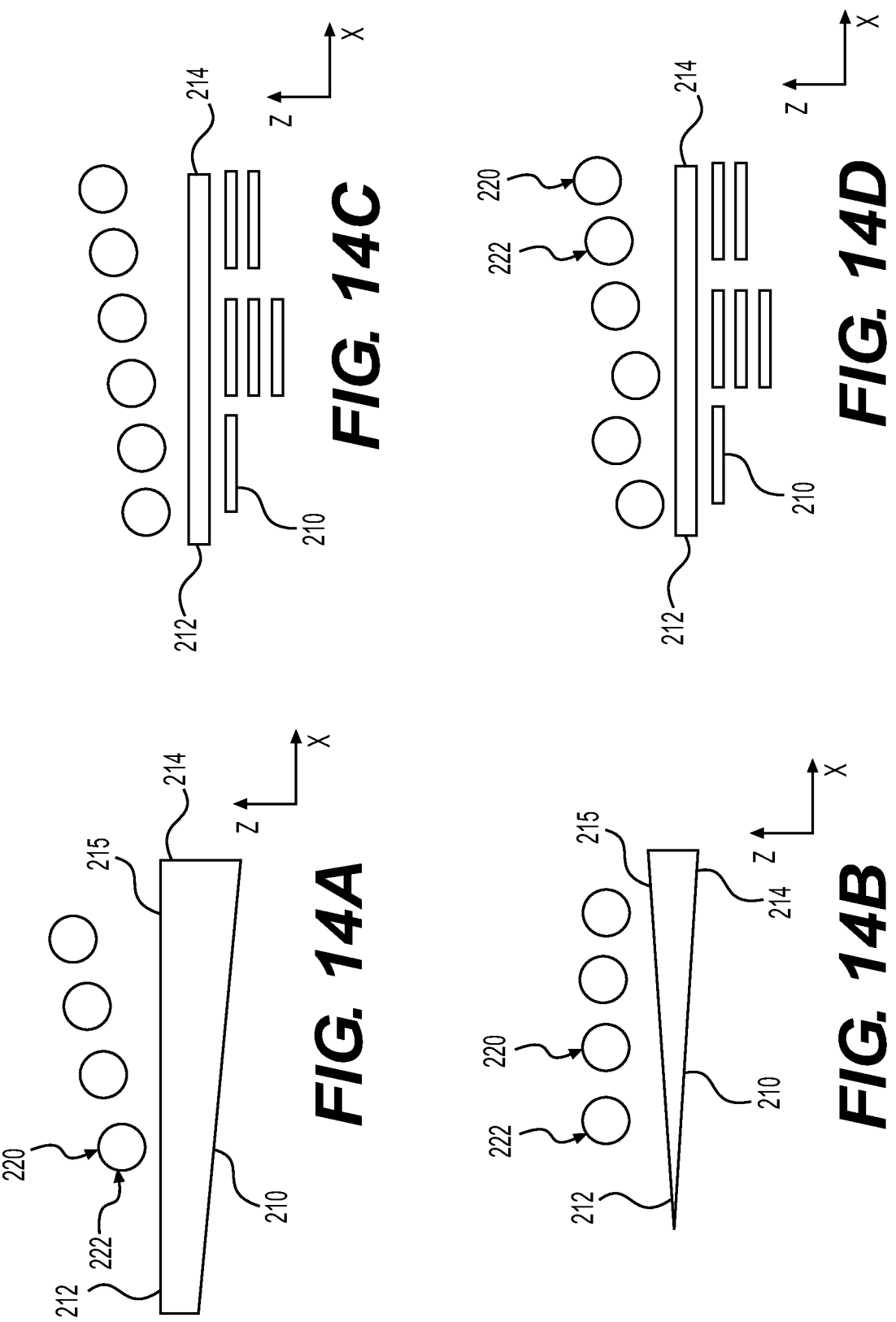
FIGS. 14A-14D are exemplary cross-sectional diagrams illustrating other alternative embodiments of the transmitter assembly of FIG. 3, wherein the primary back shield and the primary inductor are non-uniformly spaced.

FIG. 14A-14D illustrate exemplary cross-sectional diagrams of the primary back shield 210 and the primary inductor 220, wherein the loops 222 have a non-uniform distance from the primary back shield 210. The percentage of decay of the strength of the EM field that the primary inductor 220 exerts on surface of the primary back shield 210 can thus be dependent on the location along the surface. FIG. 14A shows the loops 222 of the primary inductor 220 as having a constant slope relative to the x-y plane and the primary back shield 210 as having the first surface 215 parallel to the x-y plane. The thickness of the primary back shield 210 is shown as varying according to a linear profile. The distance between the primary inductor 220 and the primary back shield 210 thus varies linearly from the center region 212 to the outer perimeter region 214.

FIG. 14B shows the loops 222 of the primary inductor 220 as being arranged in a row 224 parallel to the x-y plane and the primary back shield 210 as having the first surface 215 at a constant slope relative to the x-y plane. The thickness of the primary back shield 210 is shown as varying according to a linear profile. The distance between the primary inductor 220 and the primary back shield 210 thus varies linearly from the center region 212 to the outer perimeter region 214.

FIG. 14C shows the loops 222 of the primary inductor 220 as having a constant slope relative to the x-y plane and the primary back shield 210 as having the first surface 215 parallel to the x-y plane. The thickness of the primary back shield 210 is shown as varying according to a non-linear profile. The distance between the primary inductor 220 and the primary back shield 210 thus varies linearly from the center region 212 to the outer perimeter region 214.

FIG. 14D shows the loops 222 of the primary inductor 220 as varying according a non-linear profile relative to the x-y plane and the primary back shield 210 as having the first surface 215 parallel to the x-y plane. The thickness of the primary back shield 210 is shown as varying according to a non-linear profile. The distance between the primary inductor 220 and the primary back shield 210 thus varies non-linearly from the center region 212 to the outer perimeter region 214.

By selecting the uniform and/or non-uniform distance between the primary inductor 220 and the primary back shield 210, the spatial profile of the EM field that the primary inductor 220 exerts on the surface of the primary back shield 210 can be tailored. Additionally and/or alternatively, by selecting uniform and/or non-uniform thickness profile, the spatial profile of the secondary EM field generated by the primary back shield 210 in response to the EM field generated by the primary inductor 220 can be tailored. Advantageously, a great variety of configurations of the primary inductor 220 and the primary back shield 210 can be implemented to improve the EM field spatial profile (shown in FIG. 6).

Figure 15:
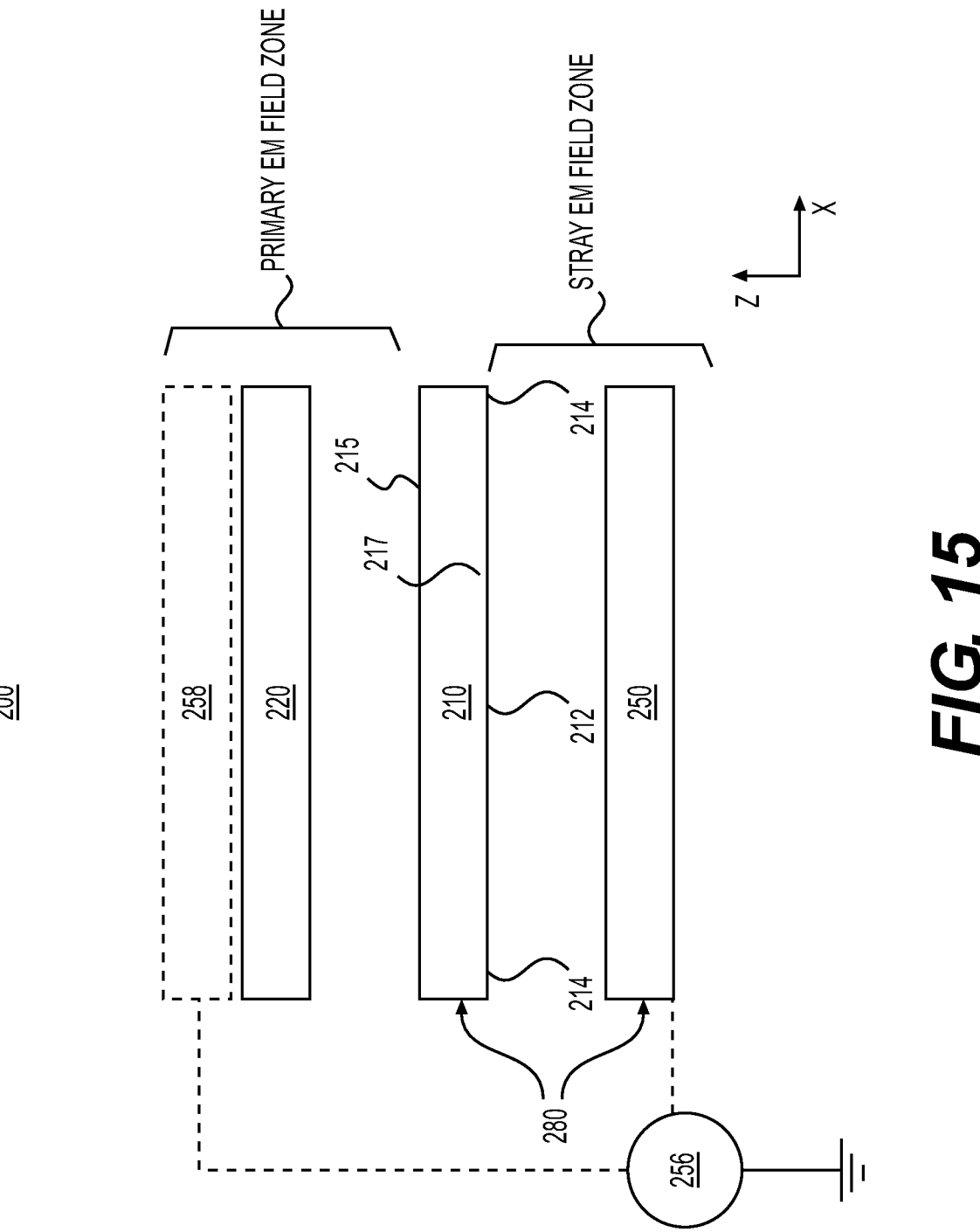
FIG. 15 is an exemplary cross-sectional diagram illustrating another alternative embodiment of the transmitter assembly of FIG. 3, wherein the back shield unit includes a secondary inductor.

Turning to FIG. 15, the back shield unit 280 as including a secondary inductor 250 proximal to the second surface 217 of the primary back shield 210. The secondary inductor 250 can include at least one coil laying out in a planar spiral pattern in a manner as described for the coil 226 (shown in FIG. 3). FIG. 15 shows the secondary inductor 250 as being connected to a control circuit 256 configured to supply a DC current. The DC current can generate a magnetic field that transmits to the primary back shield 210 via a stray EM field zone. The magnetic field can alter magnetization of the primary back shield 210 and thus change the secondary magnetic field generated by the primary back shield 210. The secondary magnetic field can transmit into the primary EM field zone and alter the total magnetic field, or the spatial distribution thereof, transmitted above ground from the transmitter assembly 200. The secondary inductor 250 can be utilized as a collector of magnetically induced stray power to further increase the efficiency of the transmitter assembly 200. In one embodiment, the secondary inductor 250 can magnetize the ferromagnetic material of the primary back shield 210, causing induced magnetic saturation that modulates the generated magnetic power profile and the mutual inductance between the transmitter assembly 200 and the receiver 320 (shown in FIG. 1).

FIG. 15 shows the control circuit 256 as being connected to a sensor unit 258 positioned proximal to the primary inductor 220. The sensor unit 258 can be configured to detect strength and/or direction of the EM field transmitted from the transmitter assembly 200. An exemplary sensor unit 258 can include one or more sensor coils configured to connect with the control circuit 256. Based on sensor data from the sensor unit 258, the control circuit 256 can determine the DC current to supply to the secondary inductor 250. Advantageously, the EM field transmitted from the transmitter assembly 200 can be adjusted in real time via the control circuit 256.

Turning to FIG. 16, the secondary inductor 250 is shown as including one or more loops 252 in a manner as described for the loops 222 (shown in FIG. 3). The coil of the secondary inductor 250 can be made of any suitably conductive material and is preferably made from insulated copper. The particular shape and composition of the coil can be selected to suit the needs of the particular application. Moreover, in some embodiments, a plurality of coils can be used. The coil can form the loops 252 in one or more uniform and/or different planes and can include one or more uniform and/or different coils arranged in any suitable manner. A distance between two neighboring loops 252 can vary at different locations of the gap between the two neighboring loops 252. The distances between each two neighboring loops 252 can be uniform and/or different. Advantageously, the loops 252 and/or the coils can be arranged in a selected configuration to magnetize the primary back shield 210 in accordance with a desired spatial profile.

FIGS. 17A-17C each show a cross section of the loops 252. FIG. 17A shows the loops 252 as being arranged in a row (or layer) 254 and evenly spaced. FIG. 17B shows the loops 252 as being arranged in a row and unevenly spaced. Stated somewhat differently, the distance between two neighboring loops 252 at a perimeter region of the secondary inductor 250 can be greater than the distance between two neighboring loops 252 at a center region of the secondary inductor 250. FIG. 17C shows the loops 252 as being arranged in one row 254 at the center region of the secondary inductor 250 and in two rows 254 at the perimeter region of the secondary inductor 250. In this way, the number of the rows 254 of the loops 252 at the perimeter region of the secondary inductor 250 can be greater than the number of the rows 254 at the center region of the secondary inductor 250.

Figure 18A:
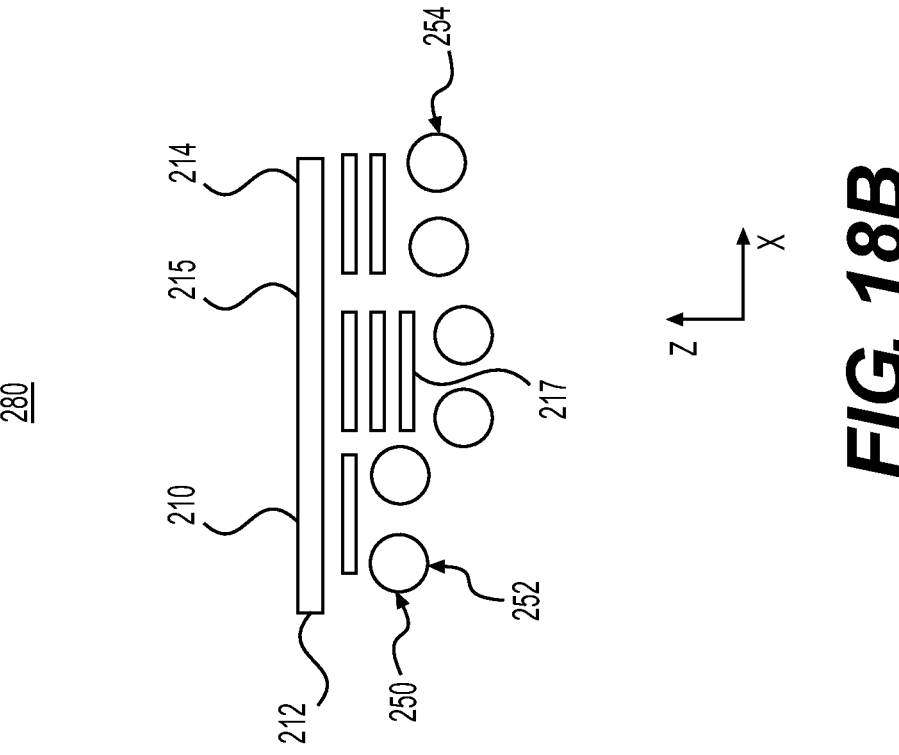
FIGS. 18A-18B are exemplary cross-sectional diagrams illustrating alternative embodiments of the back shield unit of FIG. 16, wherein the secondary inductor and the primary back shield are uniformly spaced.
Figure 18B:
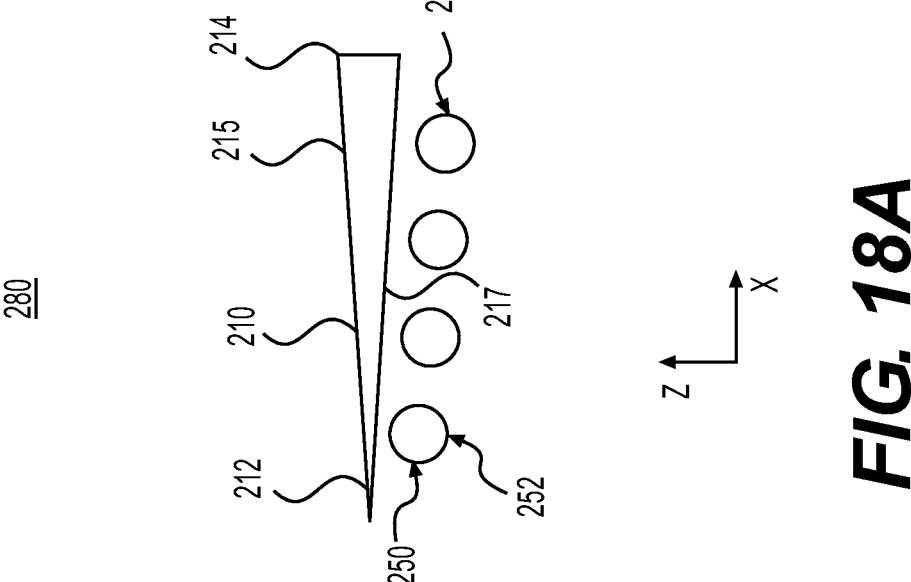

FIG. 18A-18B illustrate exemplary spatial relationships between the primary back shield 210 and the secondary inductor 250, the loops 252 having a constant distance from the primary back shield 210. The percentage of decay of the strength of the EM field emanating from the secondary inductor 250 can thus be independent from the location along the downward surface of the primary back shield 210. FIG. 18A shows the loops 252 as being arranged in a row 254 having a constant slope relative to the x-y plane and the second surface 217 of the primary back shield 210 as having the same constant slope relative to the x-y plane. The thickness of the primary back shield 210 is shown as varying according to a linear profile.

FIG. 18B shows the loops 252 as being arranged in a row 254 that curves according to a non-linear profile and the second surface 217 of the primary back shield 210 as having the same non-linear profile relative to the x-y plane. The thickness of the primary back shield 210 is shown as varying according to the non-linear profile.

FIG. 19A-19D illustrate exemplary spatial relationships between the primary back shield 210 and the secondary inductor 250, the loops 252 having a non-uniform distance from the primary back shield 210. The percentage of decay of the strength of the EM field emanating from the secondary inductor 250 can thus be dependent on the location along the second surface 217 of the primary back shield 210. FIG. 19A shows the loops 252 as being arranged in a row 254 being parallel to the x-y plane and the primary back shield 210 as having the second surface 217 at a constant slope relative to the x-y plane. The thickness of the primary back shield 210 is shown as varying according to a linear profile. The distance between the secondary inductor 250 and the primary back shield 210 thus varies linearly from the center region 212 to the outer perimeter region 214.

FIG. 19B shows the loops 252 of the secondary inductor 250 as being arranged in a row 254 parallel to the x-y plane and the second surface 217 of the primary back shield 210 as having a non-linear profile relative to the x-y plane. The thickness of the primary back shield 210 is shown as varying according to the non-linear profile. The distance between the secondary inductor 250 and the primary back shield 210 thus varies non-linearly from the center region 212 to the outer perimeter region 214.

FIG. 19C shows the loops 252 as being arranged in a row 254 having a constant slope relative to the x-y plane and the second surface 217 of the primary back shield 210 as having a non-linear profile relative to the x-y plane. The thickness of the primary back shield 210 is shown as varying according to the non-linear profile. The distance between the secondary inductor 250 and the primary back shield 210 thus varies non-linearly from the center region 212 to the outer perimeter region 214.

By selecting the uniform and/or non-uniform distance between the secondary inductor 250 and the primary back shield 210, the spatial profile of the EM field that the secondary inductor 250 exerts on the surface of the primary back shield 210 can be tailored. Additionally and/or alternatively, by selecting uniform and/or non-uniform thickness profile, the spatial profile of the secondary EM field generated by the primary back shield 210 in response to the EM field generated by the secondary inductor 250 can be tailored. Advantageously, a great variety of configurations of the secondary inductor 250 and the primary back shield 210 can be implemented to improve the EM field spatial profile (shown in FIG. 6).

Figure 20:
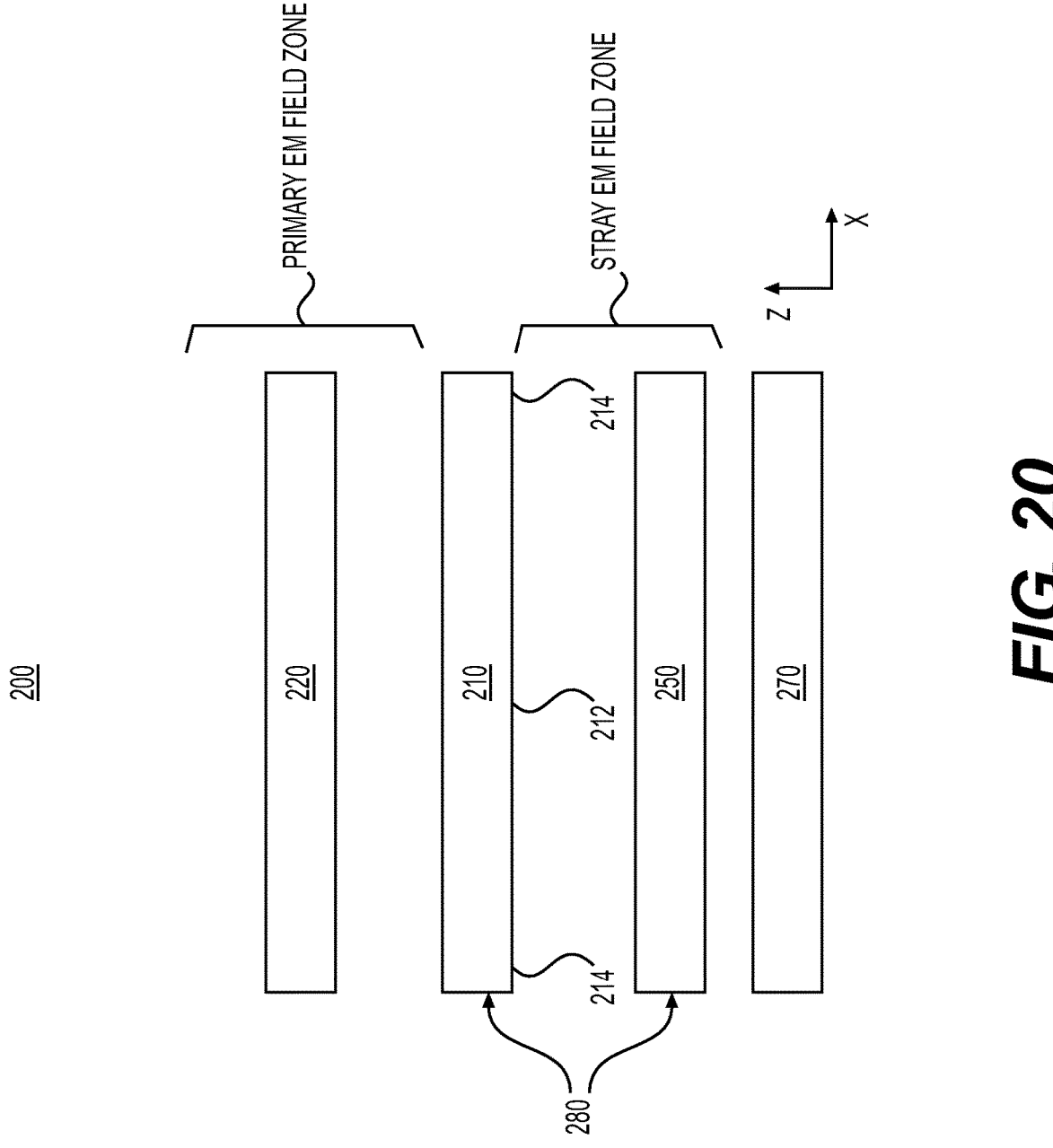
FIG. 20 is an exemplary cross-sectional diagram illustrating another alternative embodiment of the transmitter assembly of FIG. 3, wherein the back shield unit includes a secondary back shield.

Turning to FIG. 20, the back shield unit 280 as including a secondary back shield 270 proximal to the secondary inductor 250 and distal from the primary back shield 210. In one embodiment, the secondary back shield 270 can be at least partially made of a material with high magnetic permeability, such as ferrite. Thus, the secondary back shield 270 can capture stray magnetic flux and at least partially prevent the magnetic flux from leaking down into the ground. Additionally and/or alternatively, in response to any stray magnetic field, a secondary EM field can be generated by the secondary back shield 270. The nonuniform spatial distribution of the electromagnetic field transmitted from the transmitter assembly 200 can be compensated and become more uniform.

Figure 21:
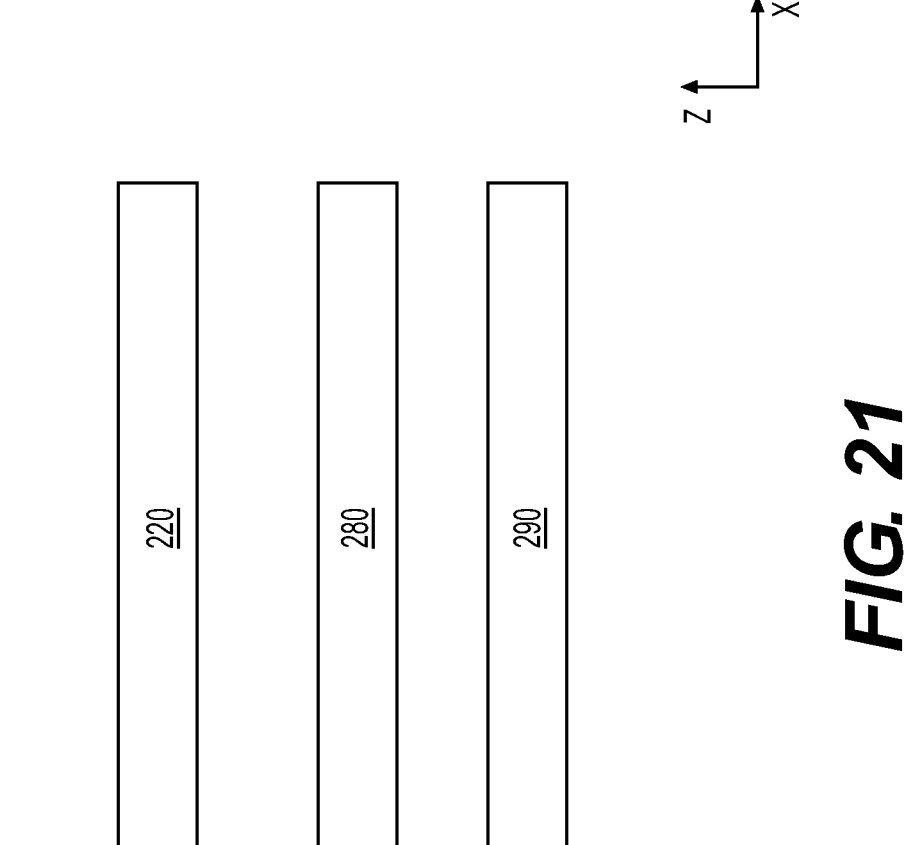
FIG. 21 is an exemplary cross-sectional diagram illustrating another alternative embodiment of the transmitter assembly of FIG. 3, wherein the transmitter assembly includes a base shield.

Turning to FIG. 21, the back shield unit 280 is shown as including a base shield 290 that is located proximal to the back shield unit 280 and distal from the primary inductor 220. As such, the back shield unit 280 is between the primary inductor 220 and the base shield 290. The base shield 290 can include a conductive sheet having a uniform and/or non-uniform thickness. Residual magnetic flux that flows in the z direction from the primary inductor 220 and/or the back shield unit 280 can induce an eddy current in the base shield 290 that generates a secondary magnetic field for directing EM power back to the primary inductor 220. Thus, power loss via radiation can be reduced and efficiency of the transmitter assembly 200 can be improved.

In one embodiment, the thickness of the base shield 290, as measured in z direction, can be non-uniform. In one embodiment, the thickness at the outer perimeter region can be greater than the thickness at the center region. Advantageously, in response to the stray magnetic field, the secondary EM field generated at the outer perimeter region of the base shield 290 can be greater than the secondary EM field generated at the center region. The nonuniform spatial distribution of the electromagnetic field can be compensated and become more uniform.

The base shield 290 can enhance radiation shielding for the transmitter assembly 200. Without the base shield 290, the primary back shield 210 (shown in FIG. 3) of the back shield unit 280 need to be made of very thick layers or tiles of ferromagnetic materials for maximizing radiation shielding. In contrast, by using the base shield 290, the back shield unit 280 can be made of thinner layers or tiles of ferromagnetic materials. Advantageously, cost of making the primary back shield 210 can be saved. Further, packaging of the transmitter assembly 200 can be more compact.

The base shield 290 can be made of any conductive material. Exemplary base shield 290 can be made of a metal that has low electric resistance at high frequency. For example, the metal can include gold, copper, aluminum, or alloys thereof. Advantageously, the base shield 290 does not generate excessive heat from the eddy currents.

Figure 22:
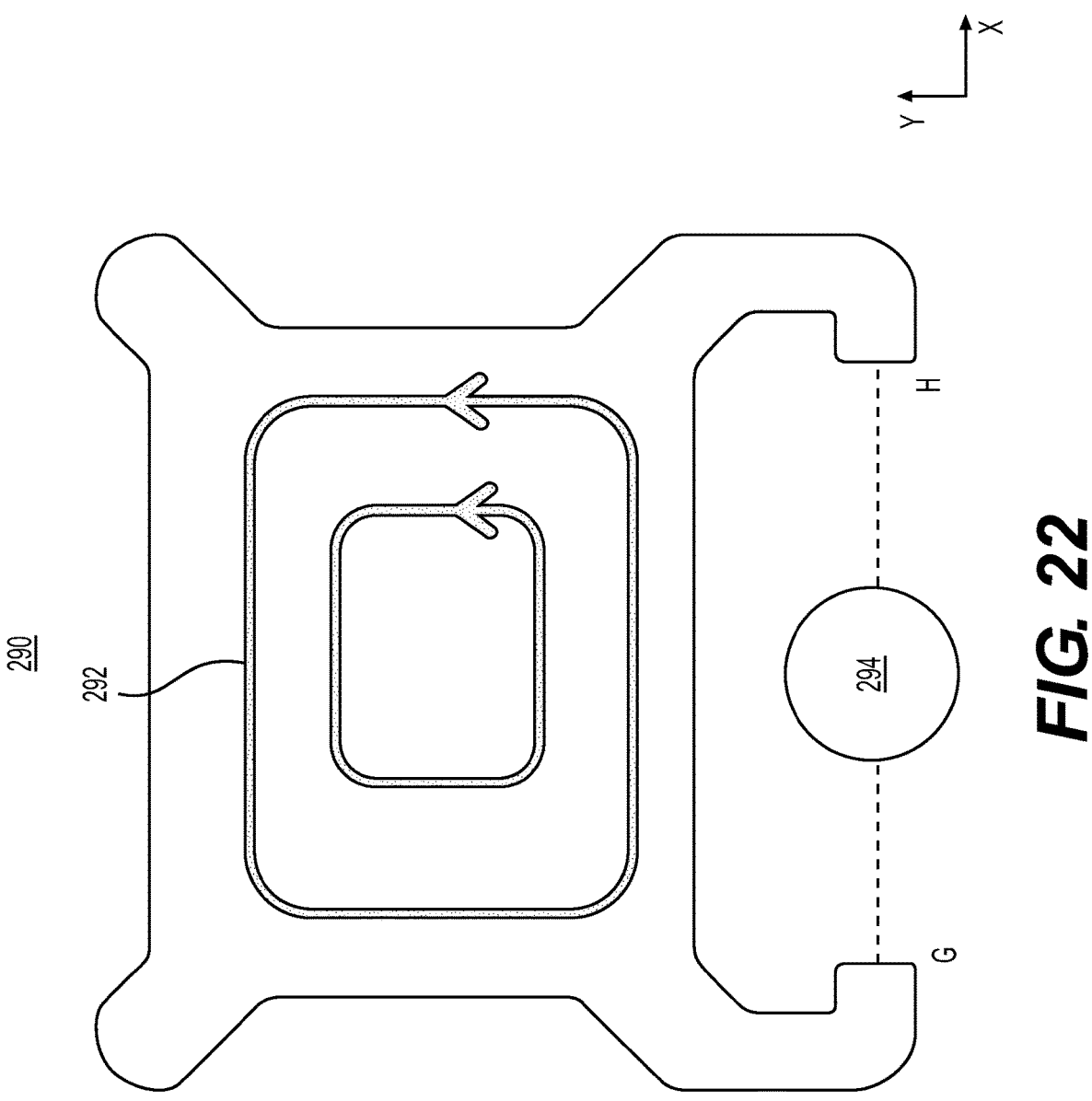
FIG. 22 is an exemplary diagram illustrating an alternative embodiment of the base shield of FIG. 21.

Turning to FIG. 22, an exemplary base shield 290 is shown. The base shield 290 can have a solid shape. Eddy currents 292 are induced by residual magnetic flux. Optionally, a closed circuit can be formed by connected points G and H and introducing a control circuit 294 in between. An current applied by the control circuit 294 across the base shield 290 can adjust the direction and/or magnitude of the eddy currents 292.

Further, the applied current can be measured between G and H in order to indicate a failure and/or flaw in the back shield unit 280 (shown in FIG. 21), which can be signaled by an unexpected significant change in the measured current. For example, if back shield unit 280 has a flawed or broken tile 216 (shown in FIG. 9), the current measured would exhibit a significant increase, thereby indicating the existence of the flawed tile 216. This measurement can be done as a quality control check during production or installation of the unit. And this measurement can continue from time to time throughout the life of the transmitter to detect wear and tear. Advantageously, this improves the overall reliability of the back shield unit 280.

Figure 23:
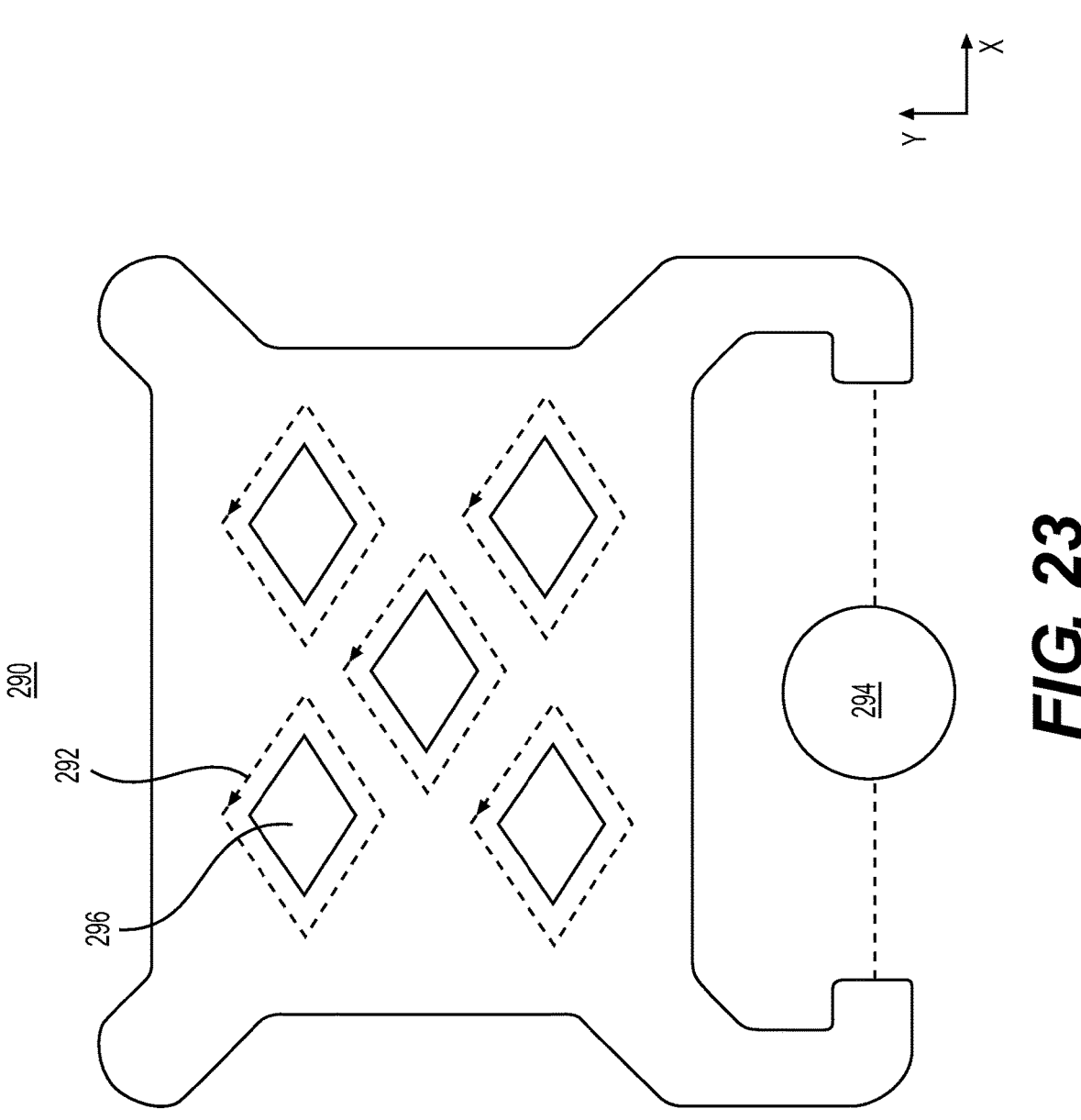
FIG. 23 is an exemplary diagram illustrating another alternative embodiment of the base shield of FIG. 21, wherein the base shield defines one or more voids.

Turning to FIG. 23, the base shield 290 is shown as defining a plurality of voids 296. The eddy currents 292 thus can form in the base shield 290 around periphery region of each void 296. Each void 296 can thus function as an inductive coil. As a result, the distribution of the eddy currents 292 can be adjusted by modifying size, shape, arrangement, dimension, and/or geometry of the voids 296. Accordingly, spatial distribution of the secondary magnetic field generated by the eddy currents 292 can be adjusted, too.

The base shield 290 can compensate for the non-uniform distribution the electromagnetic field generated by the transmitter assembly 200 (shown in FIG. 1) and, for example, preferentially increase eddy current 292 at edge regions of the base shield 290 to increase secondary magnetic field at the edge regions. Thus, the spatial distribution of the electromagnetic field generated by the transmitter assembly 200 can be more uniform. This arrangement improves overall parking alignment tolerances of the system 100 (shown in FIG. 1). Further, lost energy can be recovered and increase coupling efficiency of the system 100.

FIG. 23 shows the base shield 290 as defining four diamond voids 296 at four corners of a rectangle and surrounding a diamond void 296. The base shield 290 can define any selected number of uniform and/or different voids 296 arranged in any selected pattern, without limitation. Exemplary shapes can include triangle, rectangle, circle, oval, square, or a combination thereof.

Figure 24:
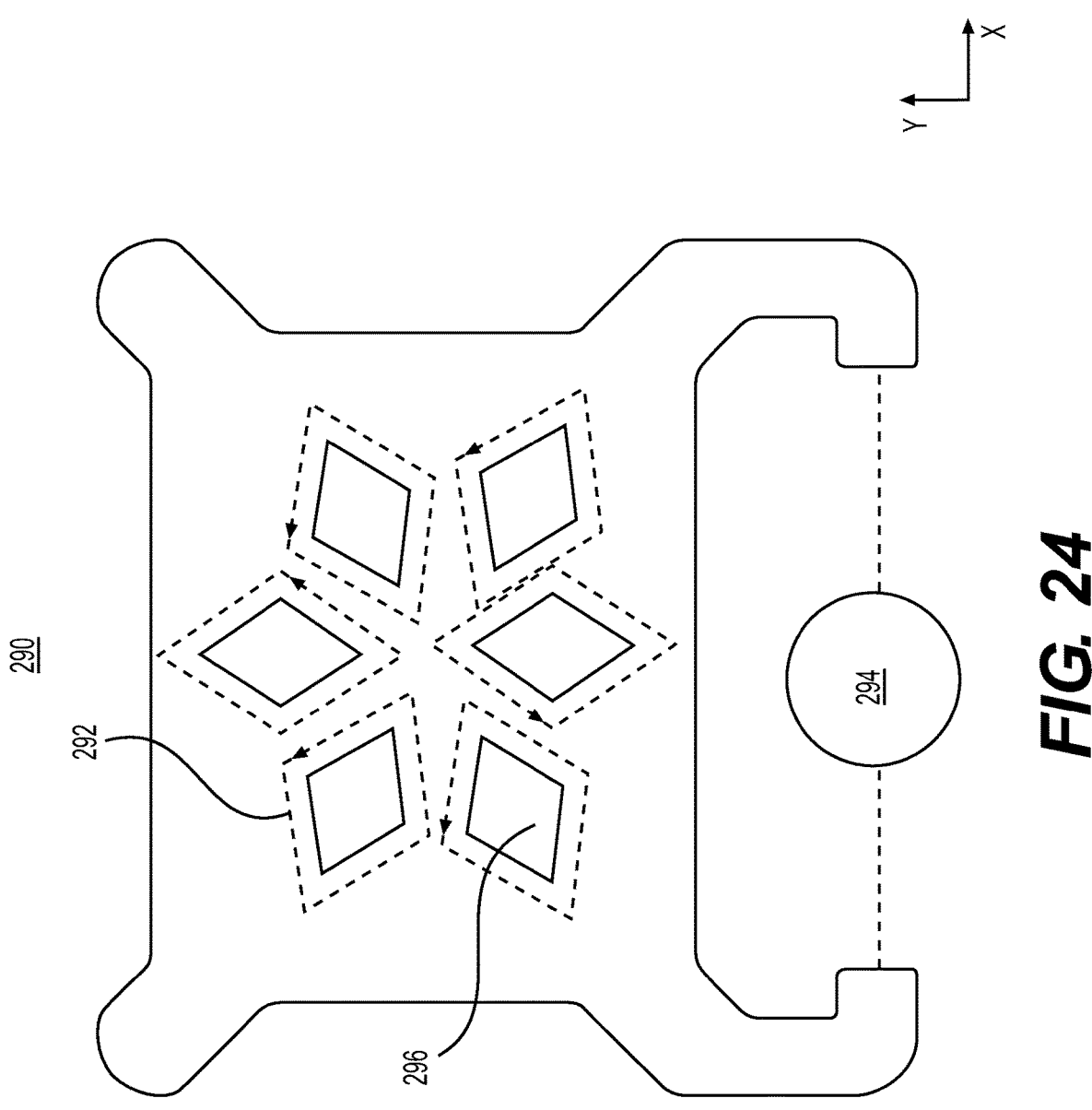
FIG. 24 is an exemplary diagram illustrating another alternative embodiment of the base shield of FIG. 21, wherein the base shield defines a plurality of voids arranged circularly.

Turning to FIG. 24, the base shield 290 is shown as defining a plurality of voids 296 arranged in a circle. Because the base shield 290 does not define the center void 296, the eddy current 292 can be spatially distributed differently from the eddy current 292 shown in FIG. 23. In one embodiment, the size of the voids 296 on the base shield 290 can be correlated with the spatial distribution of magnetic density that the transmitter assembly 200 (shown in FIG. 21) transmits. For example, a void 296 of a large size can be formed at a location aligned with, or having the same x, y coordinates as, a location on the primary inductor 220 where magnetic density is low.

Figure 25:
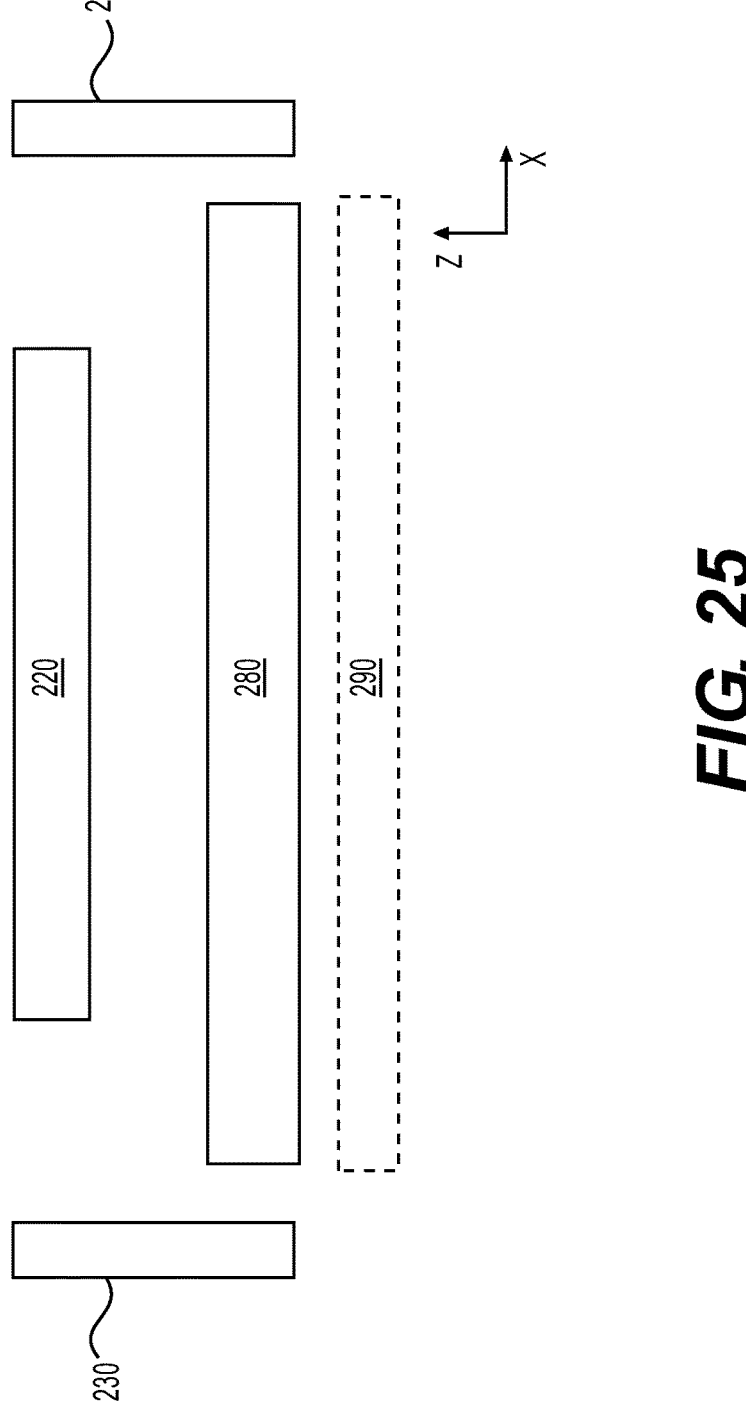
FIG. 25 is an exemplary cross-sectional diagram illustrating another alternative embodiment of the transmitter assembly of FIG. 3, wherein the transmitter assembly includes a side shield unit.

Turning to FIG. 25, the transmitter assembly 200 is shown as including a side shield unit 230. The side shield unit 230 is show as being located at a selected distance from the primary inductor 220 and configured to at least partially shielding electromagnetic radiation not parallel to the z direction. The side shield unit 230 can encircle the back shield unit 280 and/or the primary inductor 220. As such, the side shield unit 230 and the back shield unit 280 can collectively and at least partially enclose the primary inductor 220. This leaves only the top of the primary inductor 220 unshielded, thereby, causing the EM field to be generally directed upward. Advantageously, even if the back shield unit 280 does not shield the radiation completely, the side shield unit 230 can enhance safety of the transmitter assembly 200 by reducing EM field radiation out the sides of the transmitter assembly 200 along the direction of the x-y plane. Stated somewhat differently, stray EM field can be reduced, and the coupling factor can be improved. The side shield unit 230 can result in an increased magnetic field density on the periphery of the transmitter assembly 200 that reduces stray fields and results in increased coupling factor.

Although FIG. 25 shows the side shield unit 230 as being vertical to the primary back shield 210 for illustrative purposes only, the side shield unit 230 can be at any uniform and/or different angles relative to the back shield unit 280, without limitation. In one example, the angle can be 90 degrees to ease packaging. In another example, the side shield unit 230 can be at a selected angle that ranges from 90 degrees to 170 degrees to imitate a convex shape for effectively recover the magnetic radiation.

FIG. 25 shows, for illustrative purposes only, the based shield 290 as not extending under the side shield unit 230 and the side shield unit 230 as not extending across the outer perimeter regions of the based shield 290. In various embodiments, the based shield 290 can extend in x or y directions, under the side shield unit 230, and at least partially encompass or span across the side shield unit 230. Additionally and/or alternatively, the side shield unit 230 can extend in z direction to at least partially encompass or span across the outer perimeter regions of the based shield 290.

Figure 26:
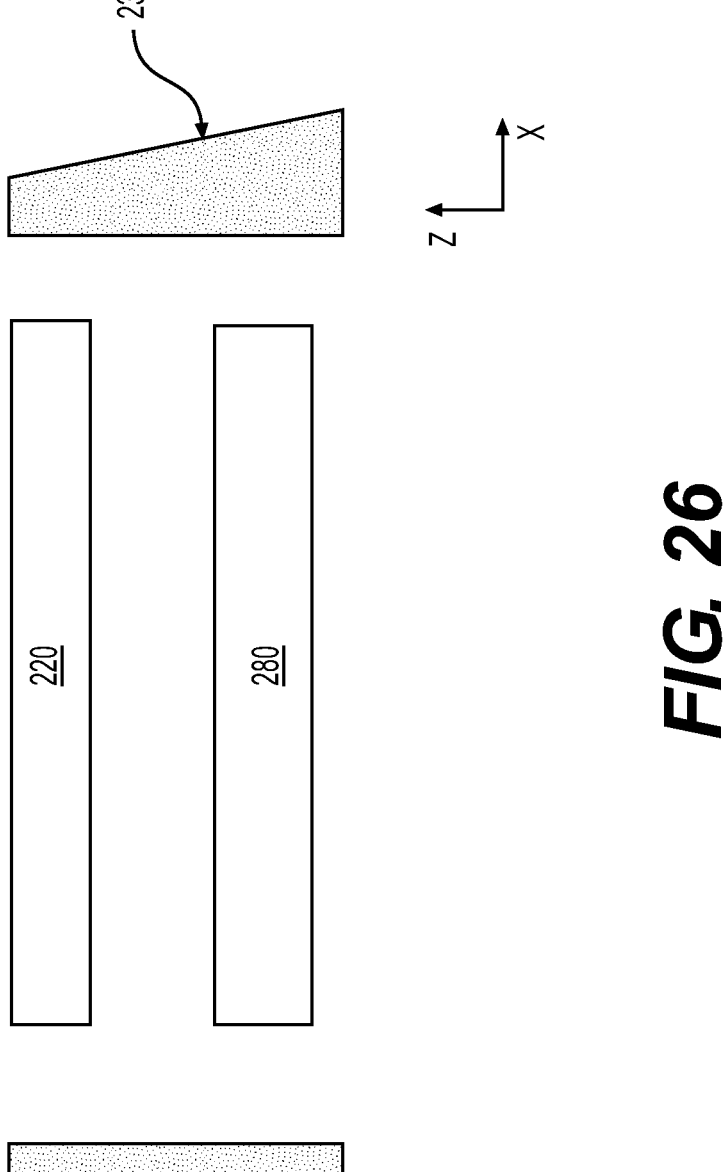
FIG. 26 is an exemplary cross-sectional diagram illustrating another alternative embodiment of the transmitter assembly of FIG. 25, wherein the side shield unit includes a primary side shield.

Turning to FIG. 26, the side shield unit 230 is shown as including a primary side shield 232. In one embodiment, the primary side shield 232 can be at least partially made of a material with high magnetic permeability, in a manner similar to the primary back shield 210 (shown in FIG. 3). The primary side shield 232 is shown as having a thickness, measured in the x direction, that is uniformly and/or non-uniformly distributed along z direction between two end regions of the primary side shield 232. Thus, in response to the same stray magnetic field transmitted from the primary inductor 220, a secondary EM field generated by the top region can be greater than a secondary EM field generated by the bottom region. The spatial distribution of the electromagnetic field transmitted from the transmitter assembly 200 can be compensated and become more uniform.

The thickness of the primary side shield 232 is shown as varying from the top region to the bottom region according to a linear profile. Stated somewhat differently, at a plurality of points along a side surface (or a surface facing x direction) of the primary side shield 232, the thicknesses of the primary side shield 232 is a linear function of the positions of the points. Alternatively, the thickness of the primary side shield 232 can vary from the top region to the bottom region at least partially according to a non-linear profile.

Figure 27:
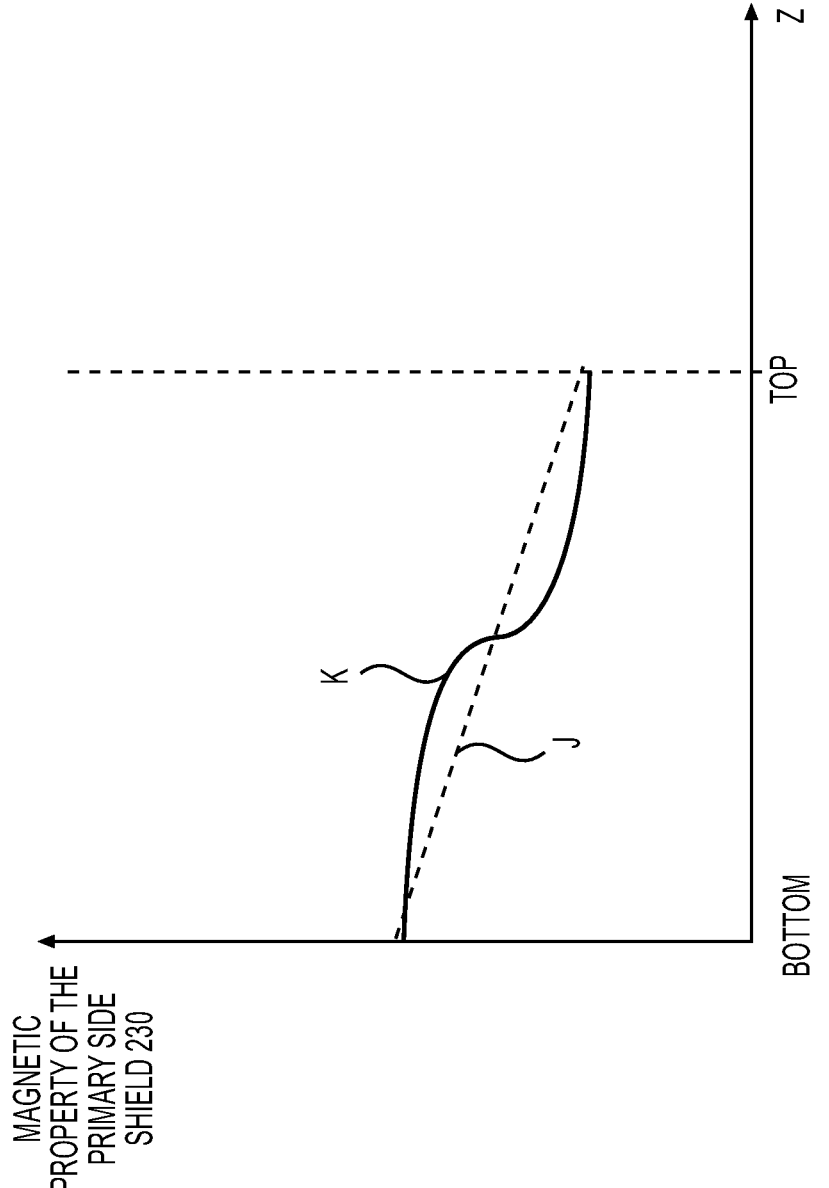
FIG. 27 is an exemplary diagram illustrating spatial distributions of a magnetic property of a primary side shield of the of the side shield unit of FIG. 25.

Turning to FIG. 27, the primary side shield 232 is shown as having a non-uniform magnetic property. An exemplary magnetic property can include the magnetic permeability. The magnetic permeability is shown as being lower at the top region and higher at the bottom region with reference to z direction. Advantageously, in response to the stray magnetic field transmitted from the primary inductor 220 (shown in FIG. 25), a secondary EM field generated by the bottom region can be greater than a secondary EM field generated by the top region. The nonuniform spatial distribution of the electromagnetic field transmitted from the transmitter assembly 200 (shown in FIG. 25) can be compensated and become more uniform.

The magnetic property can have a non-uniform spatial distribution from the top region to the bottom region according to a linear profile, shown as line J for illustrative purposes. Stated somewhat differently, at a plurality of points along a side surface (or a surface facing x direction) of the primary side shield 232, the magnetic property of the primary side shield 232 is a linear function of the positions (or z coordinates) of the points.

The magnetic property of the primary side shield 232 can vary from the top region to the bottom region at least partially according to a non-linear profile, shown as curve K for illustrative purposes. Stated somewhat differently, at a plurality of points along the side surface of the primary side shield 232, the magnetic property of the primary side shield 232 is a non-linear function of the positions (or z coordinates) of the points. Advantageously, even if the primary side shield 232 has a uniform thickness, the primary side shield 232 can generate the secondary EM field with a desired spatial profile to effectively compensate for, and improve the uniformity of, the spatial profile of the EM field transmitted from the transmitter assembly 200. The primary side shield 232 can be made of a single piece of solid that is made of a combination of materials having respective magnetic properties.

Additionally and/or alternatively, the primary side shield 232 can include stacks 238 (shown in FIG. 28) of tiles 236 (shown in FIG. 28) in a manner similar to the stacks 218 (shown in FIGS. 9, 10 and 12) of the tiles 216 (shown in FIGS. 9, 10 and 12). Each stack 238 can include a selected number of tiles 236 to achieve uniform and/or non-uniform thicknesses of the primary side shield 232 according to a selected linear or non-linear profile.

Additionally and/or alternatively, each tile 236 can be made of one or more materials having selected magnetic properties, respectively, such that the stacks 238 can have respective effective magnetic properties. The primary back shield 210 can have the magnetic property varying in accordance with a selected spatial profile. Advantageously, even if the stacks 238 have a uniform number of tiles 216, the primary side shield 232 can generate the secondary EM field with a desired spatial profile to effectively compensate for, and improve the uniformity of, the spatial profile of the EM field transmitted from the transmitter assembly 200.

Figure 28:
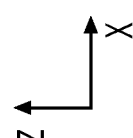
FIG. 28 is an exemplary cross-sectional diagram illustrating an alternative embodiment of the side shield unit of FIG. 25, wherein the side shield unit includes a plurality of stacks of tiles.

Turning to FIG. 28, the primary side shield 232 is shown as including a plurality of stacks 238 of tiles 236 arranged in an array. FIG. 28 further shows a shield base 231 for hosting the tiles 236. The shield base 231 can be made of a material that is electromagnetically insulating. In one embodiment, the shield base 231 can be shaped as a planar tray defining concaved slots that fits each of the tiles 236. The shield base 231 is shown as including spacers 233 to at least partially separate every two neighboring tiles 236. Stated somewhat differently, the spacer 233 can be a wall between every two neighboring tiles 236 and achieve insulation therebetween. In one embodiment, the shield base 231 and/or the spacer 236 can be made of an insulator such as a plastic material.

The shield base 231 and/or the spacer 233 can be made, and/or function, in a manner respectively similar to the shield base 211 (shown in FIG. 12) and spacers 213 (shown in FIG. 12). Thus, the shield base 231 and/or the spacer 233 can provide significant mechanical robustness and flexibility, improve efficiency of the transmitter assembly 200 (shown in FIG. 25) and extend lifetime of the primary side shield 232.

Figure 29:
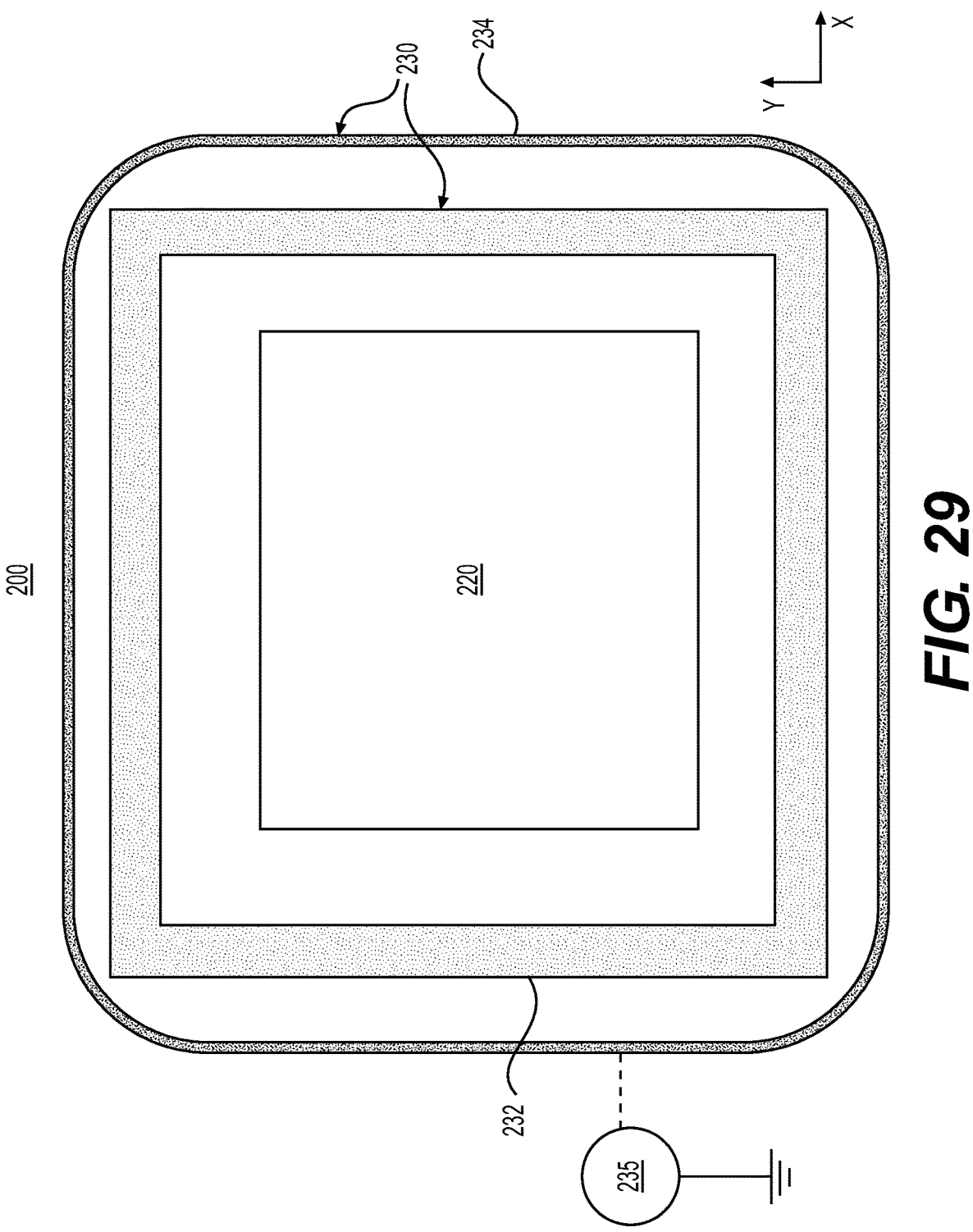
FIG. 29 is an exemplary diagram illustrating another alternative embodiment of the transmitter assembly of FIG. 25, wherein the side shield unit includes a secondary side inductor.

Turning to FIG. 29, the side shield unit 230 is shown as further including a secondary side inductor 234 that at least partially encloses the primary side shield 232. The secondary side inductor 234 can include at least one coil laying out in a two- and/or three-dimensional spiral pattern that moves around the z axis while moves parallel to the z axis. Stated somewhat differently, the secondary side inductor 234 can have a helical shape that includes one or more conductive coils made, for example, of copper or aluminum and encircling the primary side shield 232 in the x-y plane. The secondary side shield 234 can be insulated from the primary side shield 232 by a selected material such as plastic and/or rubber.

The secondary side inductor 234 can function as an inductor and capture residual magnetic flux that flows outside a periphery of the primary side shield 232. The secondary side inductor 234 can induce a current that generates secondary magnetic field for directing EM energy back to the primary inductor 220. Thus, power loss via radiation can be reduced. Coupling factor or efficiency of the transmitter assembly 200 can be improved. Because of the shielding by the secondary side inductor 234, the transmitter assembly 200 can operate at a higher voltage and thus reduce charging time for the vehicle 300 (shown in FIG. 1), without generating harmful emission to surround environment. Further, more electronic components can be packaged in proximity to the primary side shield 232 without a need of bulky insulation for protecting the electronic components from the emission. Thus, packaging can be simplified and cost of making the transmitter assembly 200 can be reduced.

FIG. 29 shows the secondary inductor 234 as being connected to a control circuit 235 configured to supply a DC current. The DC current can generate a magnetic field that transmits to the primary side shield 232. The magnetic field can alter magnetization of the primary side shield 232 and thus change the secondary magnetic field generated by the primary side shield 232. The secondary magnetic field can transmit into the primary EM field zone (shown in FIG. 20) and alter the total magnetic field, or the spatial distribution thereof, transmitted above ground from the transmitter assembly 200. Optionally, based on sensor data from the sensor unit 258 (shown in FIG. 15), the control circuit 235 can determine the DC current to supply to the secondary side inductor 234. Advantageously, the EM field transmitted from the transmitter assembly 200 can be adjusted in real time via the control circuit 235.

Figure 30:
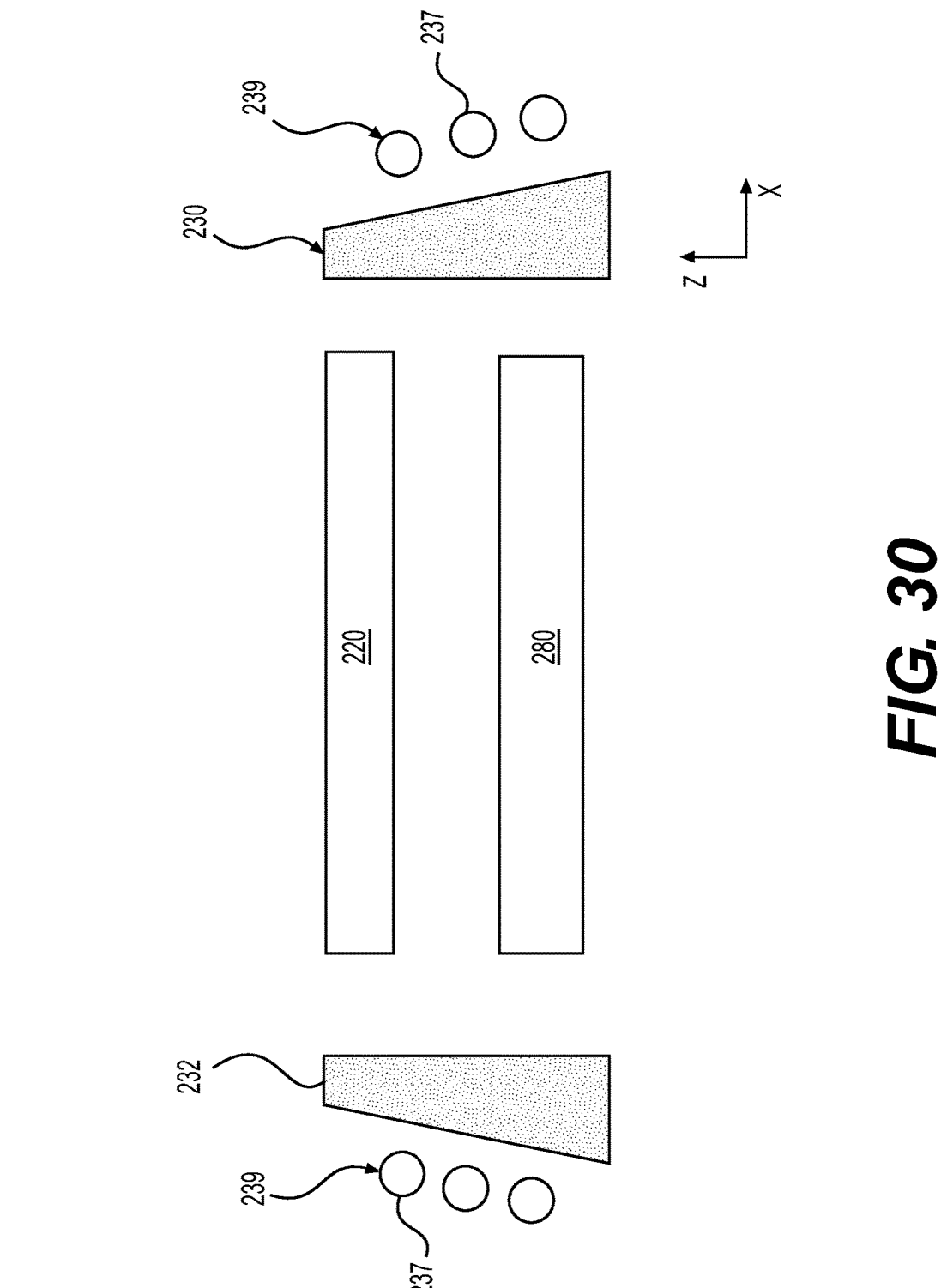
FIG. 30 is an exemplary diagram illustrating another alternative embodiment of the transmitter assembly of FIG. 29, wherein the secondary side inductor includes at least one coil forming a plurality of loops.

Turning to FIG. 30, the secondary side inductor 234 is shown as including one or more loops 237 in a manner as described for the loops 252 (shown in FIG. 16). The coil of the secondary side inductor 234 can be made of any suitably conductive material and is preferably made from insulated copper. The particular shape and composition of the coil can be selected to suit the needs of the particular application. Moreover, in some embodiments, a plurality of coils can be used. The coil can form the loops 237 in one or more uniform and/or different planes and can include one or more uniform and/or different coils arranged in any suitable manner. A distance between two neighboring loops 237 can vary at different locations of the gap between the two neighboring loops 237. The distances between each two neighboring loops 237 can be uniform and/or different. Advantageously, the loops 237 and/or the coils can be arranged in a selected configuration to magnetize the primary side shield 232 in accordance with a desired spatial profile.

FIG. 30 shows a cross section of the loops 237 in the x-z plane. The loops 237 are shown as being arranged in at least one column (or layer) 239. The loops 237 can be arranged in a manner similar to the loops 252 (shown in FIG. 17). Stated somewhat differently, the loops 237 in the same column 239 can be evenly and/or unevenly spaced. Additionally and/or alternatively, the loops 237 can be arranged into two or more columns 239.

The distance between the primary side shield 232 and the secondary inductor 234 can have a spatial profile along the z direction in a manner similar to the distance between the primary back shield 210 and the secondary inductor 250 (shown in FIGS. 18A-19C). FIG. 30 shows the loops 237 of the secondary inductor 234 as being arranged in a row 239 having a constant slope relative to the z axis and the outer surface of the primary side shield 232 as having the same constant slope relative to the z axis. However, any other suitable configurations of the distance can be possible. For example, the loops 237 can have a linear and/or non-linear profile relative to the z axis. The outer surface of the primary side shield 232 proximal to the loops 237 can have a linear and/or non-linear profile relative to the z axis. The distance between the row 239 and the outer surface of the primary side shield 232 can be uniform or non-uniform.

Figure 31:
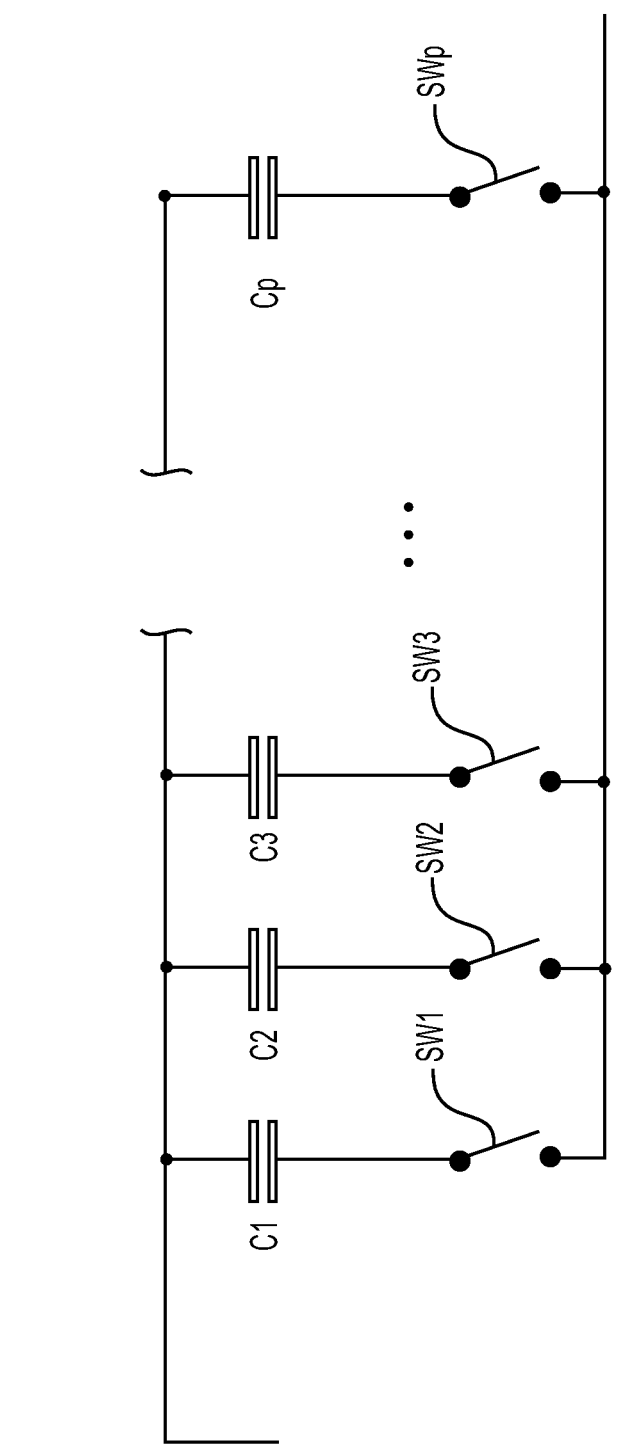
FIG. 31 is an exemplary circuit diagram illustrating an embodiment of a capacitor unit of the system of FIG. 2.

FIG. 31 shows an advantageous switchable capacitor array embodiment of variable capacitor 240. As shown in FIG. 31, there are a set of capacitors C1 through Cp and switches SW1 through SWp are connected. Each capacitor is connected in series with a corresponding switch and each switch/capacitor pair is connected in parallel. Because the capacitors are additive when arranged in parallel, the total possible capacitance of FIG. 31 arrangement is the sum of capacitances of capacitors C1 through Cp. By selectively opening switches SW1 through SWp individual capacitors can be disconnected from the circuit and the total capacitance can be reduced.

The circuit of FIG. 31 has a further advantage that a relatively large capacitance can be created from a number of smaller capacitor components. In addition to selective capacitance, this arrangement has cost and packaging benefits. Specifically, a large number of relatively low-cost, low profile discrete capacitor components can be arranged in an array on a circuit board according to the circuit structure of FIG. 31. Those circuit boards provide a generally flat package that eases integration into the housing of transmitter assembly 200 (shown in FIG. 1). Moreover, the capacitor laden circuit boards are modular and can themselves be connected in parallel to further increase capacitance or physically break up the circuits to ease packaging into the transmitter housing.

Figure 32:
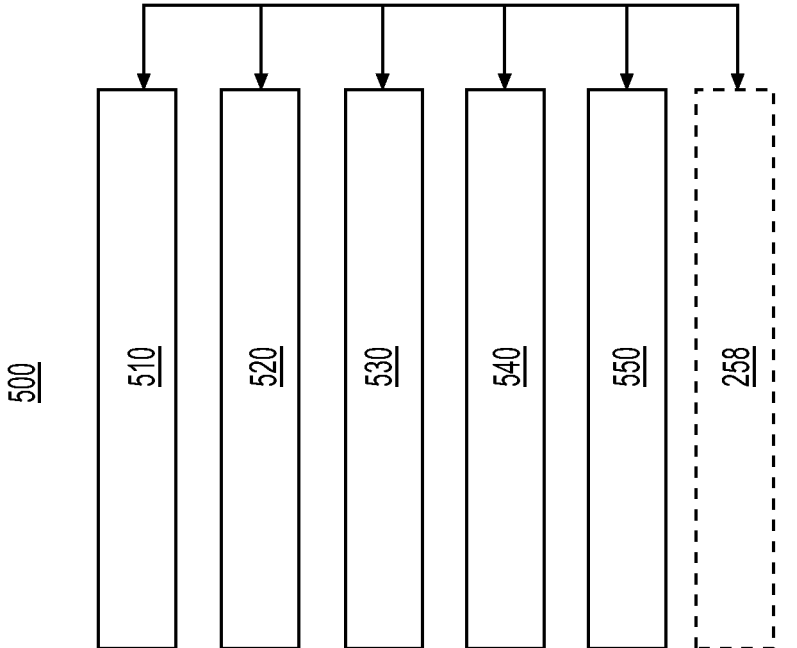
FIG. 32 is an exemplary diagram illustrating an embodiment of a control system for controlling the system of FIG. 1.

Turning to FIG. 32, a control system 500 is shown. The control system 500 can be configured for control of the optional variable capacitor 240 (shown in FIG. 2), the control circuit 256 (shown in FIG. 15), the control circuit 294 (shown in FIG. 22) and/or control circuit 235 (shown in FIG. 29). The control system 500 can include a processor 510. The processor 510 can include one or more general-purpose microprocessors (for example, single or multi-core processors), application-specific integrated circuits, application-specific instruction-set processors, graphics processing units, physics processing units, digital signal processing units, coprocessors, network processing units, encryption processing units, and the like. The processor 510 can execute instructions for implementing the control system 500. In an un-limiting example, the instructions include one or more software programs.

As shown in FIG. 32, the control system 500 can include one or more additional hardware components as desired. Exemplary additional hardware components include, but are not limited to, a memory 520 (alternatively referred to herein as a non-transitory computer readable medium). Exemplary memory 520 can include, for example, random access memory (RAM), static RAM, dynamic RAM, read-only memory (ROM), programmable ROM, erasable programmable ROM, electrically erasable programmable ROM, flash memory, secure digital (SD) card, and/or the like. Instructions for implementing the control system 500 can be stored on the memory 520 to be executed by the processor 510.

Additionally, and/or alternatively, the control system 500 can include a communication module 530. The communication module 530 can include any conventional hardware and software that operates to exchange data and/or instruction between the control system 500 and another computer system (not shown) using any wired and/or wireless communication methods. For example, the control system 500 can receive feedback data corresponding to the vehicle 300 (shown in FIG. 1) and/or receive the sensor data from the sensor unit 258 (shown in FIG. 15) via the communication module 530. Exemplary communication methods include, for example, radio, Wireless Fidelity (Wi-Fi), cellular, satellite, broadcasting, or a combination thereof.

Additionally, and/or alternatively, the control system 500 can include a display device 540. The display device 540 can include any device that operates to present programming instructions and/or data related to the operation of the system to any operator. Additionally, and/or alternatively, the control system 500 can include one or more input/output devices 550 (for example, buttons, a keyboard, keypad, trackball, sensor inputs, control outputs), as desired.

The sensor unit 258 is shown as being optionally integrated with the control system 500. The processor 510, the memory 520, the communication module 530, the display device 540, the input/output device 550 and/or the sensor unit 258 can be configured to communicate, for example, using hardware connectors and buses and/or in a wireless manner.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A transmitter assembly, comprising:
   a primary inductor configured to produce an electromagnetic field, the primary inductor including a single coil that is wound into a plurality of loops, the plurality of loops are arranged into a first number of rows positioned adjacent to a perimeter region of the primary inductor and a second number of rows positioned adjacent to a center region of the primary inductor, wherein the first number of rows of the plurality of loops of the single coil that is positioned adjacent to the perimeter region is greater than the second number of rows of the plurality of loops of the coil positioned adjacent to the center region such that the plurality of loops of the single coil that are stacked over one another adjacent to the perimeter region exceed the plurality of loops of the single coil that are stacked over one another adjacent to the center region, and the electromagnetic field produced by the primary inductor is increased at the perimeter region relative to the center region, and the plurality of loops in the first number of rows are positioned relatively above one another along the perimeter region; and
   a back shield unit including a primary back shield that has a first surface proximal to the primary inductor and a second surface opposite to the first surface, the primary back shield being at least partially made of a ferromagnetic material.

2. The transmitter assembly of claim 1, wherein the second number of rows includes a single row positioned adjacent to the center region of the primary inductor, and the first number of rows includes two rows positioned adjacent to the perimeter region of the primary inductor.

3. The transmitter assembly of claim 1, wherein the plurality of loops are arranged into a non-linear shape.

4. The transmitter assembly of claim 1, wherein the single coil includes a planar spiral pattern that forms the plurality of loops.

5. The transmitter assembly of claim 1, wherein a distance between the first number of rows and the second number of rows is based on a spacing configuration.

6. The transmitter assembly of claim 5, wherein the primary inductor is configured to increase or decrease the electromagnetic field based upon the distance between the first number of rows and the second number of rows.

7. The transmitter assembly of claim 1, wherein the first number of rows and the second number of rows are positioned parallel to an x-y plane, and the first surface of the primary back shield is parallel to the x-y plane.

8. The transmitter assembly of claim 1, wherein the primary back shield includes an array of stacks each including one or more tiles being stacked, and a number of the one or more tiles in each stack is distributed from a center region of the primary back shield to an outer perimeter region of the primary back shield.

9. The transmitter assembly of claim 1, wherein the primary back shield includes a property that is non-uniformly distributed from a center region of the primary back shield to an outer perimeter region of the primary back shield, the property including a thickness, a magnetic property, or a combination thereof.

10. A transmitter assembly, comprising:
   a primary inductor configured to produce an electromagnetic field, the primary inductor including a coil winding into a plurality of loops arranged into a first number of rows positioned at two or more perimeter sides of the primary inductor and a second number of rows positioned at a center region of the primary inductor, wherein the first number of rows is greater than the second number of rows such that the plurality of loops of the coil stacked at the perimeter region exceed the plurality of loops of the coil stacked at the center region and the electromagnetic field produced by the primary inductor is increased along the perimeter region relative to the center region, and the plurality of loops of the coil in the first number of rows are arranged in overlapping planes relative to one another such that the coil overlaps onto itself at the perimeter region; and
   a back shield unit including a primary back shield that has a first surface proximal to the primary inductor and a second surface opposite to the first surface, the primary back shield being at least partially made of a ferromagnetic material.

11. A transmitter assembly, comprising:

a primary inductor configured to produce an electromagnetic field, the primary inductor including a coil that is wound into a plurality of loops, the plurality of loops are arranged into a first number of rows and a second number of rows, wherein the first number of rows is positioned proximate to a perimeter of the primary inductor and the second number of rows is positioned proximate to a center of the primary inductor, the first number of rows being greater than the second number of rows such that the plurality of loops stacked at the perimeter exceed the plurality of loops stacked at the center and the electromagnetic field produced by the primary inductor is increased at the perimeter relative to the center, and the plurality of loops in the first number of rows are positioned in layers that are stacked relative to one another; and a back shield unit including a primary back shield that has a first surface proximal to the primary inductor and a second surface opposite to the first surface, wherein the primary back shield is at least partially made of a ferromagnetic material.

12. The transmitter assembly of claim 11, wherein the second number of rows includes a single row positioned proximate to the center of the primary inductor, and the first number of rows includes two rows positioned proximate to the perimeter of the primary inductor.

13. The transmitter assembly of claim 11, wherein the coil includes a planar spiral pattern that forms the plurality of loops.

14. The transmitter assembly of claim 11, wherein the coil is comprised of a conductive material.

15. The transmitter assembly of claim 11, wherein the primary inductor is configured to increase or decrease the electromagnetic field that is produced based upon a distance between the first number of rows and the second number of rows.

16. The transmitter assembly of claim 11, wherein the first number of rows and the second number of rows are positioned parallel to the first surface of the primary back shield.

17. The transmitter assembly of claim 11, wherein the primary back shield includes one or more tiles stacked in an array.

18. The transmitter assembly of claim 11, wherein the primary back shield has a property that is non-uniformly distributed from a center region of the primary back shield to an outer perimeter region of the primary back shield, the property including a thickness, a magnetic property, or a combination thereof.

19. The transmitter assembly of claim 10, the primary back shield having a property that is non-uniformly distributed from a center region of the primary back shield to an outer perimeter region of the primary back shield, the property including a thickness, a magnetic property, or a combination thereof.

20. The transmitter assembly of claim 1, wherein a thickness of the primary back shield unit varies from the center region to the perimeter region in a linear function such that the primary back shield unit has an angled surface with a linear profile between the center region and the perimeter region.

* * * * *